United States Patent [19]
Inata et al.

[11] 4,331,800
[45] May 25, 1982

[54] PROCESS FOR PRODUCING AROMATIC POLYESTERS HAVING AN INCREASED DEGREE OF POLYMERIZATION

[75] Inventors: Hiroo Inata, Hino; Shunichi Matsumura, Hachioji; Makoto Ogasawara, Hino, all of Japan

[73] Assignee: Teijin Limited, Osaka, Japan

[21] Appl. No.: 144,036

[22] Filed: Apr. 28, 1980

[30] Foreign Application Priority Data

| May 2, 1979 | [JP] | Japan | 54/53352 |
| May 2, 1979 | [JP] | Japan | 54/53352 |
| May 2, 1979 | [JP] | Japan | 54/53353 |
| Jun. 6, 1979 | [JP] | Japan | 54/69864 |
| Jun. 8, 1979 | [JP] | Japan | 54/71154 |
| Jul. 16, 1979 | [JP] | Japan | 54/89323 |
| Jul. 26, 1979 | [JP] | Japan | 54/94185 |
| Jul. 26, 1979 | [JP] | Japan | 54/94186 |
| Sep. 25, 1979 | [JP] | Japan | 54/121924 |
| Oct. 2, 1979 | [JP] | Japan | 54/126397 |
| Dec. 20, 1979 | [JP] | Japan | 54/164683 |
| Dec. 25, 1979 | [JP] | Japan | 54/167624 |
| Jan. 14, 1980 | [JP] | Japan | 55/2129 |

[51] Int. Cl.$^3$ .................. C08G 69/44; C08G 63/68
[52] U.S. Cl. .................. 528/289; 525/437; 528/291; 528/292; 528/309
[58] Field of Search .......... 525/437; 528/288, 289, 528/291, 292, 309

[56] References Cited

U.S. PATENT DOCUMENTS

| 3,932,358 | 1/1976 | de Cleur et al. | 528/288 |
| 3,959,215 | 5/1976 | Schneider | 528/289 |
| 4,138,545 | 12/1979 | Emmons et al. | 528/289 |

*Primary Examiner*—Lucille M. Phynes
*Attorney, Agent, or Firm*—Sherman & Shalloway

[57] ABSTRACT

A process for producing an aromatic polyester having an increased degree of polymerization, which comprises reacting a substantially linear, fiber forming aromatic polyester containing terminal hydroxyl groups and having an aromatic dicarboxylic acid as a main acid component at an elevated temperature with a bis-cyclic imino ether compound of the formula [I] such as 2,2'-bis(2-oxazoline), 2,2'-bis(5,6-dihydro-4H-1,3-oxadine) thereby bonding the molecular chains of the aromatic polyester to each other by the terminal carboxyl groups thereof to rapidly form said aromatic polyester having an increased degree of polymerization.

Said reaction can be carried out under atmospheric or elevated pressure.

According to the process, an aromatic polyester having a low terminal caboxyl concentration and an increased degree of polymerization can be obtained.

38 Claims, No Drawings

PROCESS FOR PRODUCING AROMATIC POLYESTERS HAVING AN INCREASED DEGREE OF POLYMERIZATION

This invention relates to a process for producing aromatic polyesters. More specifically, this invention relates to a process for rapidly producing aromatic polyesters having increased degrees of polymerization which comprises reacting the molecular chains of an aromatic polyester with a bis-cyclic imino ether compound to bond them to each other by its terminal carboxyl groups.

Known methods for rapidly increasing the degrees of polymerization of an aromatic polyester includes, for example, the reaction of an aromatic polyester having a relatively low molecular weight with a diaryl carbonate such as diphenyl carbonate under reduced pressure in the molten state (see U.S. Pat. No. 3,444,141); the reaction of an aromatic polyester with a diaryl ester of an aromatic dicarboxylic acid such as diphenyl terephthalate (see U.S. Pat. No. 3,433,770); the reaction of an aromatic polyester with a diaryl ester of oxalic or malonic acid (see U.S. Pat. No. 3,433,770); the reaction of an aromatic polyester with a polyalkylene oxalate such as polyethylene oxalate (see U.S. Pat. No. 3,637,910); and the reaction of an aromatic polyester with an orthoaryl ester of an aromatic or aliphatic dicarboxylic acid (see U.S. Pat. No. 3,984,379).

All of the aforesaid polymerization promotors generate by-products such as carbon dioxide gas or phenols upon reaction with the aromatic polyesters, and it is necessary in these prior techniques to remove these by-products rapidly out of the reaction system by performing the reaction under reduced pressure in the molten state. If the by-product phenols remain in the reaction system, they will react with the ester groups of the molecular chains of the aromatic polyester to cause a decrease in the degree of polymerization of the aromatic polyester. Furthermore, if the polyalkylene oxalate is used as a polymerization promotor, it undergoes an ester-interchange reaction with the aromatic polyester to decrease the degree of polymerization of the aromatic polyester.

On the other hand, polymerization promotors are known which do not generate such by-products but are incorporated in the molecular chains of the polymer. Diepoxy compounds, tetracarboxylic acid dianhydrides and diisocyanate compounds are typical examples of such polymerization promotors (see U.S. Pat. No. 3,553,157). Since a diepoxy compound, for example, forms two hydroxyl groups when linking the molecular chains of a polyester, the polycondensation reaction further proceeds through these hydroxyl groups resulting in the formation of a branched polyester.

A method is also known in which a powder coating composition composed of polymer chains containing more than 2 carboxyl groups on an average in the molecular chains which has a low molecular weight and when baked, gives a melt of a very low viscosity under heat is cross-linked with a polyvalent oxazoline compound to form a network which becomes a coated film (Japanese Laid-Open Patent Publications Nos. 37832/75, 157424/75 and 111239/76).

Japanese Laid-Open Patent Publication No. 59,525/75 discloses a method in which a fiber-forming polyester is spun in the presence of phenylene-bisoxazoline of the formula

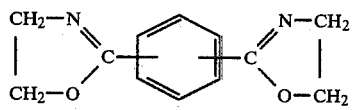

wherein the hydrogen atoms may be replaced by an alkyl or aryl group,
to reduce the decomposition of the polyester. Certainly, this method exerts an action of reducing the decomposition of the polyester, but the degree of polymerization (solution viscosity) of the resulting polyester fibers is lower than that of the starting polyester.

Investigations of the present inventors have shown that when phenylene-bisoxazoline is added to polyethylene terephthalate, an effect was noted of inhibiting the reduction of the degree of polymerization (solution viscosity) of the resulting fibers, but that the phenylenebisoxazoline does not have sufficient reactivity with terminal carboxyl groups of the polyester and therefore its action of increasing the degree of polymerization of the polyester is not sufficient.

It is an object of this invention to produce rapidly an aromatic polyester having an increased degree of polymerization by bonding the molecular chains of the aromatic polyester to each other by the terminal carboxyl groups thereof.

Another object of this invention is to provide a process for producing rapidly an aromatic polyester having an increased degree of polymerization without substantial formation of by-products and without substantially involving side-reactions by using a polymerization promotor which reacts with the molecular chains of an aromatic polyester substantially only at the terminal carboxyl groups thereof at an elevated reaction temperature, and which after the reaction, does not form any substantial by-product.

Still another object of this invention is to provide a process which can rapidly give an aromatic polyester having an increased degree of polymerization by performing the reaction not only under reduced pressure but also at atmospheric pressure or at elevated pressures.

Yet another object of this invention is to provide a process for rapidly producing an aromatic polyester having a low terminal carboxyl group concentration and an increased degree of polymerization.

Still another object of this invention is to provide a process in which a reaction to bond the molecular chains of an aromatic polyester to each other is carried out in a melt-molding machine to produce an aromatic polyester having the desired increased degree of polymerization and a molded article made of the aromatic polyester.

A further object of this invention is to provide a substantially linear aromatic polyester having a low terminal carboxyl group concentration and an increased degree of polymerization, and a molded article of the aromatic polyester.

Other objects and advantages of this invention will become apparent from the following description.

According to the most basic concept of this invention, the objects and advantages of this invention are achieved by a process for producing an aromatic polyester having an increased degree of polymerization, which comprises reacting a carboxyl-terminated, substantially linear, fiber-forming aromatic polyester having an aromatic dicarboxylic acid as a main acid component at an elevated temperature with a bis-cyclic imino ether compound of the following formula

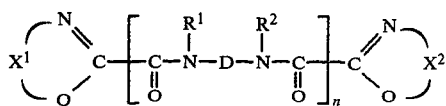

wherein $X^1$ and $X^2$ are identical or different and each represents a divalent hydrocarbon group which is non-reactive under the reaction conditions and has 2 or 3 carbon atoms as members of imino ether ring, $R^1$ and $R^2$ are identical or different and each represents a hydrogen atom or a monovalent hydrocarbon group, or $R^1$ and $R^2$ may be linked to each other to form a 5- or 6-membered ring together with D and the two nitrogen atoms to which they are bonded, D represents a divalent hydrocarbon group nonreactive under the reaction conditions which may contain a hetero atom, and n is 0 or 1,
thereby bonding the molecular chains of the aromatic polyester to each other by the terminal carboxyl groups thereof and rapidly forming said aromatic polyester having an increased degree of polymerization.

The present invention is described in greater detail below.

[A] STARTING AROMATIC POLYESTERS

Aromatic polyesters which are used in this invention have terminal carboxyl groups and are substantially linear and fiber-forming, with an aromatic dicarboxylic acid as a main acid component. These aromatic polyesters and processes for production thereof are known from many techniques which have so far been accumulated in the art.

These aromatic polyesters are derived from an aromatic dicarboxylic acid as a main acid component and an alkylene glycol or both an alkylene glycol and a polyoxyalkylene glycol as a main glycol component.

Examples of aromatic dicarboxylic acids are terephthalic acid, isophthalic acid, naphthalenedicarboxylic acid, diphenyldicarboxylic acid, diphenylsulfonedicarboxylic acid, diphenoxyethanedicarboxylic acid, diphenyletherdicarboxylic acid, methylterephthalic acid, and methylisophthalic acid.

Examples of the alkylene glycols are polymethylene glycols having 1 to 10 carbon atoms such as ethylene glycol, trimethylene glycol, tetramethylene glycol, hexamethylene glycol and decamethylene glycol, and cyclohexane dimethylol.

Examples of the polyoxyalkylene glycols are polyoxyethylene glycol, polyoxypropylene glycol, polyoxytrimethylene glycol, polyoxytetramethylene glycol, and copolymerized polyoxyalkylene glycols having at least two of these oxyalkylene units as recurring units.

The aromatic polyesters having an aromatic dicarboxylic acid as a main acid component and an alkylene glycol as a main glycol component are homopolymers or copolymers derived from at least one aromatic dicarboxylic acid exemplified above as the main acid component and at least one alkylene glycol exemplified above as the main glycol component, and include, for example, polyethylene terephthalate, polytrimethylene terephthalate, polytetramethylene terephthalate, polyethylene-2,6-naphthalenedicarboxylate, and polyethylene terephthalate-isophthalate.

Aromatic polyesters derived from an aromatic dicarboxylic acid as a main acid component and an alkylene glycol and a polyoxyalkylene glycol as a main glycol component are generally called "polyester elastomers" because of their high elasticity. They are copolymers derived from at least one aromatic dicarboxylic acid exemplified above as the acid component and at least one alkylene glycol exemplified above and at least one polyoxyalkylene glycol exemplified above as the main glycol component. For example, there can be cited a polyester elastomer having terephthalic acid as the acid component and tetramethylene glycol and polyoxytetramethylene glycol as the glycol component.

Polyester elastomers in which the polyoxyalkylene glycol has an average molecular weight of 500 to 5,000, preferably 600 to 4,000, especially preferably 800 to 3,000 are preferred. Also, advantageously used are polyester elastomers in which the proportion of the polyoxyalkylene moiety attributed to the polyoxyalkylene glycol used is 5 to 85% by weight, preferably 10 to 80% by weight, especially preferably 15 to 75% by weight, based on the polyester elastomer.

The aromatic polyesters that can be used in this invention are not limited to those derived from aromatic dicarboxylic acids as the acid component and alkylene glycols or both alkylene glycols and polyoxyalkylene glycols as the glycol component, and may include those which are derived from these compounds as the main component and other subsidiary components.

Examples of such subsidiary components include acid components, for example aliphatic dicarboxylic acids such as succinic acid, adipic acid, sebacic acid, decanedicarboxylic acid and dodecanedicarboxylic acid, alicyclic dicarboxylic acids such as cyclohexanedicarboxylic acid, ε-hydroxycaproic acid, hydroxybenzoic acid and hydroxyethoxybenzoic acid; trifunctional or higher compounds such as trimethylol propane, pentaerythritol, trimellitic acid and pyromellitic acid; and monofunctional compounds such as benzoylbenzoic acid and diphenylcarboxylic acid.

The subsidiary acid component may be included in an amount of not more than 20 mole%, preferably not more than 15 mole%, especially preferably not more than 10 mole%, based on the total acid component. The trifunctional or higher compound may be incorporated in an amount of usually not more than 1 mole% of the total acid component, in which amount the aromatic polyester is maintained substantially linear. The use of monofunctional compounds which block terminal carboxyl groups is insignificant unless there is some special reason for it. But those which block terminal hydroxyl groups can be used without any substantial influence on the reaction carried out in accordance with this invention.

Preferred aromatic polyesters used in this invention are a polyester derived from terephthalic acid as a main acid component and ethylene glycol, tetramethylene glycol or hexamethylene glycol as a main glycol component (i.e., having an ethylene terephthalate, tetramethylene terephthalate or hexamethylene terephthalate recurring unit), and a polyester derived from terephthalic acid as a main acid component and tetramethylene glycol and polytetramethylene glycol as a main glycol component.

These aromatic polyesters can be produced by an ester-interchange method or a direct polymerization method in the presence of known catalysts in a manner known per se. For example, a polyester elastomer can be produced by heating an aromatic dicarboxylic acid or its ester-forming derivative and tetramethylene glycol and polytetramethylene glycol in the presence of a titanium catalyst such as titanium tetrabutoxide to 180° to 250° C., and then gradually increasing the degree of pressure reduction.

That the aromatic polyester used in this invention has terminal carboxyl groups should not be construed to mean that all terminal groups are carboxyl groups, nor that the concentration of the terminal carboxyl groups is higher than that of terminal hydroxyl groups. As stated in detail hereinbelow, the reaction in accordance with this invention results in bonding of the molecular chains of the aromatic polyester to each other by the terminal carboxyl groups. Hence, with the progress of the reaction, the degree of polymerization of the aromatic polyester increases rapidly, and when the desired degree of polymerization is reached, the resulting aromatic polyester still has terminal carboxyl groups.

The starting aromatic polyesters having terminal carboxyl groups used in this invention include, for example, polyesters such as polyethylene terephthalate having a higher concentration of terminal hydroxyl groups than terminal carboxyl groups obtained by an ordinary method for producing aromatic polyesters in which a glycol component is used in a stoichiometrically larger amount than an acid component; polyesters having a relatively increased concentration of terminal carboxyl groups as a result of undergoing heat history during or after the polymerization; and polyesters having a relatively high concentration of terminal carboxyl groups obtained by adding a terminal carboxylating agent such as a carboxylic acid anhydride during the polycondensation.

One characteristic feature of this invention is that even when a polyester having a lower concentration of terminal carboxyl groups than that of terminal hydroxyl groups is used, its molecular chains can be bonded to each other by its terminal carboxyl groups to rapidly afford an aromatic polyester having an increased degree of polymerization.

Advantageously, an aromatic polyester having a terminal carboxyl group concentration of at least 10 equivalents, preferably at least 15 equivalents, especially at least 20 equivalents, per $10^6$ g of polymer is used in the process of this invention.

The "fiber-forming" property of the polyester denotes its property of being molded into a fibrous form as a result of having some degree of polymerization, irrespective of the properties, etc. of the resulting fibers. Accordingly, solution viscosity, which depends upon the degree of polymerization, can be a measure of the fiber-forming property of the aromatic polyester. Advantageously used in this invention as the starting fiber-forming aromatic polyester are an aromatic polyester derived from an aromatic dicarboxylic acid as the main acid component and ethylene glycol as the main glycol component and having an intrinsic viscosity, measured in ortho-chlorophenol at 35° C., of at least 0.3, preferably at least 0.4, and a polyester elastomer derived from an aromatic dicarboxylic acid as the main acid component and an alkylene glycol and a polyoxyalkylene glycol as the main glycol component and having a reduced viscosity ($f_{sp}/c$), measured at 35° C. for a solution of polymer in ortho-chlorophenol in a concentration (c) of 1.2 g/dl, of at least 0.5, preferably at least 0.6, above all at least 0.8. From the viewpoint of the properties, uses, etc. of the resulting aromatic polyesters with an increased degree of polymerization, the starting aromatic polyesters desirably have a melting point of at least 170° C.

[B] BIS-CYCLIC IMINO ETHERS

The bis-cyclic imino ethers used in this invention are expressed by the following general formula

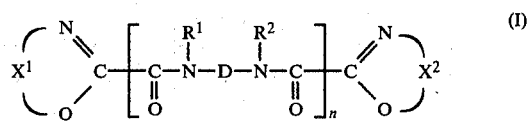

wherein $X^1$ and $X^2$ are identical or different and each represents a divalent hydrocarbon group which is non-reactive under the reaction conditions and has 2 or 3 carbon atoms as members of the imino ether ring, $R^1$ and $R^2$ are identical or different and each represents a hydrogen atom or a monovalent hydrocarbon group, or $R^1$ and $R^2$ may be linked to each other to form a 5- or 6-membered ring together with D and the two nitrogen atoms to which they are bonded, D represents a divalent hydrocarbon group non-reactive under the reaction conditions which may contain a hetero atom, and n is 0 or 1.

Examples of the divalent hydrocarbon group for $X^1$ and $X^2$ in formula [I] include unsubstituted alkylene groups such as ethylene and trimethylene; alkylene groups substituted by alkyl groups having 1 to 6 carbon atoms, such as 1-methylethylene, 1,1-dimethylethylene, 1,2-dimethylethylene, 1-ethylethylene, 1,1-diethylethylene, 1-propylethylene, 1-butylethylene, 1-hexylethylene and 1-methyltrimethylene. Of these, ethylene and trimethylene are preferred, and ethylene is especially preferred.

Examples of the monovalent hydrocarbon for $R^1$ and $R^2$ include alkyl groups having 1 to 10 carbon atoms such as methyl, ethyl, propyl, butyl, hexyl and decyl; aryl groups having 6 to 12 carbon atoms such as phenyl and tolyl; cycloalkyl groups having 5 to 12 carbon atoms such as cyclohexyl; and aralkyl groups having 7 to 13 carbon atoms such as benzyl.

$R^1$ and $R^2$ may be linked to each other to form a 5- or 6-membered ring together with D and the two nitrogen atoms to which they are bonded. The group resulting from the bonding of $R^1$ and $R^2$ is, for example, methylene, ethylene, or the hydrocarbon group for $R^1$ or $R^2$, especially methylene or ethylene substituted by an alkyl group.

Hydrogen, and an alkyl group having 1 to 6 carbon atom are preferred as $R^1$ and $R^2$, and $R^1$ and $R^2$ preferably form a methylene or ethylene group when taken together. In particular, $R^1$ and $R^2$ are preferably hydrogen atoms.

Examples of the non-reactive divalent hydrocarbon group for D include alkylene groups having 2 to 10 carbon atoms such as ethylene, propylene, butylene, pentylene, hexamethylene, octamethylene, nonamethylene and decamethylene; arylene groups having 6 to 16 carbon atoms such as groups of the formula

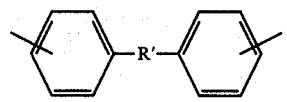

wherein R' is —O—, —CO—, —S—, —SO$_2$—, —CH$_2$—, —CH$_2$CH$_2$—, or —C(CH$_3$)$_2$—;

cycloalkylene groups having 5 to 12 carbon atoms such as cyclopentylene and cyclohexylene; alkylene-arylene groups having 7 to 24 carbon atoms such as methylenephenylene; and alkylene-arylene-alkylene groups having 8 to 24 carbon atoms such as methylene-phenylene-methylene. Of these, alkylene and arylene groups, especially the alkylene groups, are preferred.

The compounds of general formula [I] may be classified into the following groups by the number represented by n.

When n is 0, the formula [I] can be written as [I]-a below.

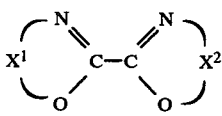

[I]-a wherein $X^1$ and $X^2$ are defined above.

When n is 1, the formula [I] can be written as formula [I]-b below.

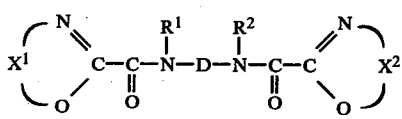

[I]-b

The compounds expressed by the above formulae [I]-a and [I]-b are understood as the same kinds of biscyclic imino ether compounds which are conducive to the achievement of the objects of this invention. The compounds of formula [I]-b are believed to be novel compounds to the best of the present inventors' knowledge. The compounds of formula [I]-a are especially preferred in the process of this invention.

Specific examples of preferred compounds of formula [I] are shown below. These compounds are called bisoxazolines when $X^1$ and $X^2$ contain two carbon atoms as members of the ring (i.e. when the imino ether ring is 5-membered); and bis(5,6-dihydro-oxazines) when $X^1$ and $X^2$ contain 3 carbon atoms as members of the ring (i.e., when the imino ether ring is 6-membered).

COMPOUNDS OF FORMULA [I]-a (1)-bisoxazolines
2,2'-bis(2-oxazoline),
2,2'-bis(4-methyl-2-oxazoline),
2,2'-bis(4,4-dimethyl-2-oxazoline),
2,2'-bis(4-ethyl-2-oxazoline),
2,2'-bis(4,4-diethyl-2-oxazoline),
2,2'-bis(4-propyl-2-oxazoline),
2,2'-bis(4-butyl-2-oxazoline),
2,2'-bis(4-hexyl-2-oxazoline),
2,2'-bis(4-phenyl-2-oxazoline),
2,2'-bis(4-cyclohexyl-2-oxazoline), and
2,2'-bis(4-benzyl-2-oxazoline).

(2) bis(5,6-dihydroxazines)
2,2'-bis(5,6-dihydro-4H-1,3-oxazine),
2,2'-bis(4-methyl-5,6-dihydro-4H-1,3-oxazine),
2,2'-bis(4-ethyl-5,6-dihydro-4H-1,3-oxazine), and
2,2'-bis(4,4-dimethyl-5,6-dihydro-4H-1,3-oxazine).

Of these, 2,2'-bis(2-oxazoline) and 2,2'-bis(5,6-dihydro-4H-1,3-oxazine) are preferred.

COMPOUNDS OF FORMULA [I]-b (1) bisoxazolines
N,N'-ethylenebis(2-carbamoyl-2-oxazoline),
N,N'-trimethylenebis(2-carbamoyl-2-oxazoline),
N,N'-tetramethylenebis(2-carbamoyl-2-oxazoline),
N,N'-hexamethylenebis(2-carbamoyl-2-oxazoline),
N,N'-octamethylenebis(2-carbamoyl-2-oxazoline),
N,N'-decamethylenebis(2-carbamoyl-2-oxazoline),
N,N'-phenylenebis(2-carbamoyl-2-oxazoline),
N,N'-ethylenebis(2-carbamoyl-4-methyl-2-oxazoline),
N,N'-tetramethylenebis(2-carbamoyl-4,4-dimethyl-2-oxazoline),
N,N'-dimethyl-N,N'-ethylenebis(2-carbamoyl-2-oxazoline), and
N,N'-dimethyl-N,N'-tetramethylenebis(2-carbamoyl-2-oxazoline).

(2) bisoxazine compounds
N,N'-ethylenebis(2-carbamoyl-5,6-dihydro-4H-1,3-oxazine),
N,N'-trimethylenebis(2-carbamoyl-5,6-dihydro-4H-1,3-oxazine),
N,N'-tetramethylenebis(2-carbamoyl-5,6-dihydro-4H-1,3-oxazine),
N,N'-hexamethylenebis(2-carbamoyl-5,6-dihydro-4H-1,3-oxazine),
N,N'-octamethylenebis(2-carbamoyl-5,6-dihydro-4H-1,3-oxazine),
N,N'-decamethylenebis(2-carbamoyl-5,6-dihydro-4H-1,3-oxazine),
N,N'-phenylenebis(2-carbamoyl-5,6-dihydro-4H-1,3-oxazine),
N,N'-ethylenebis(2-carbamoyl-4-methyl-5,6-dihydro-4H-1,3-oxazine),
N,N'-hexamethylenebis(2-carbamoyl-4,4-dimethyl-5,6-dihydro-4H-1,3-oxazine),
N,N'-dimethyl-N,N'-ethylenebis(5,6-dihydro-4H-1,3-oxazine), and
N,N'-dimethyl-N,N'-tetramethylenebis(5,6-dihydro-4H-1,3-oxazine).

Of these, N,N'-ethylenebis(2-carbamoyl-2-oxazoline) and N,N'-ethylenebis(2-carbamoyl-5,6-dihydro-4H-1,3-oxazine) are preferred.

A compound of general formula [I] can be produced by reacting a bisamide alcohol of the following formula

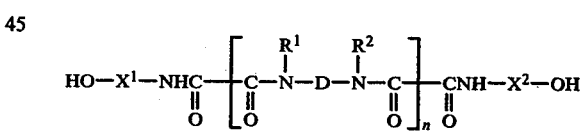

wherein $X^1$, $X^2$, $R^1$, $R^2$, D and n are as defined with regard to formula [I], with a halogenating agent such as thionyl chloride to form a bisamide halide such as bisamide chloride, and cyclizing the bisamide halide by heating it in the presence of a basic compound such as sodium hydroxide or sodium alkoxides.

The compounds of formula [I] may be used singly or in combination with each other in the process of this invention. The compounds of formula [I] exemplified hereinabove are compounds in which $X^1$ and $X^2$ are the same. But compounds of formula [I] in which $X^1$ is different from $X^2$, for example $X^1$ is ethylene and $X^2$ is trimethylene or $X^1$ is ethylene and $X^2$ is 1-methylethylene, can equally be used in the process of this invention. Examples of these compounds are apparent from the above exemplifications, and may include 2-(2-oxazolinyl)-5,6-dihydro-4H-1,3-oxazine, 2-(2- oxazolinyl)-4-methyl-2-oxazoline and 2-(2-oxazolinyl)-4,4-dimethyl-2-oxazoline.

[C] REACTION AND REACTION CONDITIONS

The process of this invention is carried out by reacting the aforesaid aromatic polyester with the bis-cyclic imino ether at an elevated temperature. As a result of this reaction, the molecular chains of the aromatic polyester are bonded to each other by its terminal carboxyl groups as shown by the following reaction scheme, and an aromatic polyester having an increased degree of polymerization forms rapidly.

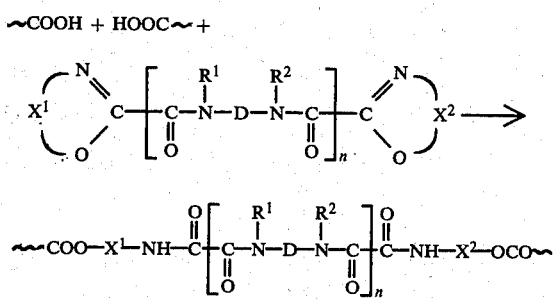

In the above scheme, ⁓⁓⁓ represents a molecular chain of the aromatic polyester.

As is clear from the above scheme, the reaction in accordance with this invention causes the molecular chains of the aromatic polyester to be bonded by the terminal carboxyl groups thereof. Hence, an aromatic polyester of an increased degree of polymerization is rapidly produced, as in the case of forming an aromatic polyester having a degree of polymerization of 200 by one reaction from an aromatic polyester having a degree of polymerization of 100. Specifically, investigations of the present inventors have shown that the bis-cyclic imino ether used in this invention can bond the molecular chains of the aromatic polyester to each other at a far higher rate than the rate at which the aromatic polyester decomposes under heat to decrease in the degree of polymerization.

The reaction in the process of this invention proceeds at an elevated reaction temperature. The reaction is carried out by intimately contacting the aromatic polyester with the bis-cyclic imino ether at a temperature above a point at which the aromatic polyester melts, i.e. the melting temperature of the aromatic polyester, (in the molten state) or at an elevated temperature below the melting temperature (in the solid phase).

When the reaction is carried out at a temperature above the melting temperature of the aromatic polyester, the reaction temperature is not more than 380° C., preferably a temperature 10° C. above the melting temperature of the aromatic polyester to 350° C., especially preferably a temperature 15° C. above the melting temperature of the aromatic polyester to 330° C.

The reaction can be performed at elevated, atmospheric or reduced pressures. The reaction in accordance with this invention proceeds very rapidly. It is sufficient to carry it out for about 15 minutes after the molten aromatic polyester and bis-cyclic imino ether contact each other intimately. Investigations of the present inventors have shown that the reaction in accordance with this invention may sometimes come to completion within a period of as short as about 30 seconds to give an aromatic polyester having the desired increased degree of polymerization.

The reaction time required in the process of this invention accounts for the very rapid proceeding of the reaction. In actual operations, however, it is permissible to mix the molten aromatic polyester and bis-cyclic imino ether for a longer period of time than the above-mentioned reaction time, and in some cases, this is preferred. In practice, therefore, the reaction time is generally from about 30 seconds to about 30 minutes, preferably from about 1 minute to about 15 minutes, especially preferably from about 2 minutes to about 10 minutes.

The reaction is preferably carried out in an inert atmosphere, for example in a nitrogen atmosphere.

The reaction in accordance with this invention in which the aromatic polyester is in the molten state may be carried out in any reaction apparatus which can afford a reaction system capable of maintaining the aromatic polyester in the molten state. For example, the reaction can be carried out in a polycondensation reactor for aromatic polyesters, or in a melt-molding machine.

In the polycondensation reactor, the reaction can be performed by adding a predetermined amount of the bis-cyclic imino ether to the molten aromatic polyester resulting from the polycondensation carrier out until it has such a degree of polymerization which renders it fiber-forming. In the melt-molding machine, a separately prepared mixture of the aromatic polyester and a predetermined amount of the bis-cyclic imino ester is fed and reacted. Or the aromatic polyester and a predetermined amount of the bis-cyclic imino ether are separately charged into the melt-molding machine, and then reacted there.

When the reaction is carried out in the polycondensation reactor, an aromatic polyester having an increased degree of polymerization is formed by the process of this invention. Accordingly, molded articles such as fibers or films can be produced from the resulting molten aromatic polyester having an increased degree of polymerization. Alternatively, the molten aromatic polyester obtained may be first converted into a molding material (e.g., chips), and then melted and molded in a melt-molding machine.

On the other hand, when the reaction is carried out in a melt-molding machine, molded articles of an aromatic polyester having an increased degree of polymerization can be obtained from the starting aromatic polyester only by a melt-molding operation because the reaction in accordance with this invention takes place within the molding machine.

It is possible also to perform the reaction of this invention in a polymerization reactor, and subject the resulting aromatic polyester having an increased degree of polymerization further to the reaction of this invention in a melt-molding machine.

Or the aromatic polyester having an increased degree of polymerization obtained by performing the reaction of this invention in the melt-molding machine may be stored as a molding material without directly molding it in the melt-molding machine, and may be melted and molded in the melt-molding machine as required.

The reaction in this invention may also be carried out in the solid state. This reaction is performed by heating the aromatic polyester and the bis-cyclic imino ether in the intimately contacted state to a temperature below the melting point of the aromatic polyester.

The reaction is carried out at a temperature of, preferably, from a point about 80° C. below the melting point of the aromatic polyester to its melting point at atmospheric or reduced pressure, preferably in an inert atmosphere such as nitrogen.

The intimately contacted state of the aromatic polyester and the bis-cyclic imino ether can be created, for example, by insufficiently reacting the aromatic polyester and the bis-cyclic imino ether in the molten state so that the aromatic polyester still has terminal carboxyl groups and an unreacted imino ether group still exists; or by contacting the aromatic polyester with the bis-cyclic imino ether in the liquid or gaseous state or with a solution of the bis-cyclic imino ether in an organic solvent capable of dissolving the bis-cyclic imino ether, such as an aromatic hydrocarbon (e.g., toluene or xylene).

The reaction of this invention in the solid phase is advantageous when it is performed after the aromatic polyester has been molded into fibers, films, etc. The molding operation in this case can be performed by using molding conditions for ordinary aromatic polyesters, and there is no need to use molding conditions for aromatic polyesters having a high degree of polymerization represented, for example, by an intrinsic viscosity of at least 1.0 (e.g., polyethylene terephthalate). By subjecting the resulting molded articles to the reaction of this invention, molded articles composed of the aromatic polyester having an increased degree of polymerization can be easily obtained.

Stoichiometrically, the reaction in accordance with this invention proceeds between 2 equivalents of the terminal carboxyl groups of the aromatic polyester and 1 mole of the bis-cyclic imino ether, as is clearly seen from the reaction scheme given hereinabove.

The process of this invention, however, is directed to the production of an aromatic polyester having an increased degree of polymerization, and not all of the terminal carboxyl groups of the aromatic polyesters used need to react with the bis-cyclic imino ether. Accordingly, even when a stoichiometrical amount of the bis-cyclic imino ether is used with regard to the terminal carboxyl groups of the aromatic polyester, or, of course, when the bis-cyclic imino ether is used in an amount smaller than its stoichiometrical amount with regard to the terminal carboxyl groups of the aromatic polyester, not all of the terminal carboxyl groups of the aromatic polyester are consumed by the process of this invention. On the other hand, when the bis-cyclic imino ether is used in an amount exceeding its stoichiometrical amount with respect to the terminal carboxyl groups of the aromatic polyester, and all of these terminal carboxyl groups are consumed, imino ether groups based on the bis-cyclic imino ether partly remain unreacted in the resulting aromatic polyester having an increased degree of polymerization.

The process of this invention essentially embraces the aforesaid embodiments.

The process of this invention is performed by using the bis-cyclic imino ether preferably in a proportion of 0.05 to 10 moles, more preferably 0.05 to 5 moles, especially 0.1 to 2 moles, per equivalent of the terminal carboxyl groups of the aromatic polyester.

In performing the process of this invention, the starting aromatic polyester is preferably dried as much as possible beforehand. The suitable water content of the starting aromatic polyester is not more than 0.03% by weight, preferably not more than 0.01% by weight. Polyester chips having a water content in this range can be easily obtained under usual drying conditions. In the process of this invention, however, aromatic polyesters of a higher water content, for example, a water content of as high as about 0.3% by weight can equally be used by using the bis-cyclic imino ether in an amount of, for example, up to 10 mole%, as stated hereinabove.

The present inventors have ascertained from the reaction of, for example, polyethylene terephthalate with 2,2'-bis(2-oxazoline), a typical bis-cyclic imino ether, that generally up to about 80% of the entire carboxyl groups of the aromatic polyester can contribute to the bonding of the molecular chains of the aromatic polyester to each other if an optimal amount of the bis-cyclic imino ether is used under optimal conditions.

[D] EMBODIMENTS OF THE PRESENT INVENTION

The essence of the present invention lies in the production of a substantially linear aromatic polyester having an increased degree of polymerization by reacting the terminal carboxyl groups of the molecular chains of the aromatic polyester with the bis-cyclic imino ether.

For example, there are roughly the following embodiments using the reaction of this invention.

(1) Embodiment in which the aromatic polyester and the bis-cyclic imino ether are directly used as starting materials.

(2) Embodiment in which the aromatic polyester and a thermoplastic resin containing the bis-cyclic imino ether in the unreacted state and/or in the form of an end blocking agent are used as starting materials.

(3) Embodiment in which the aromatic polyester, an organic dicarboxylic acid anhydride capable of forming terminal carboxyl groups by reaction with the terminal hydroxyl groups, and the bis-cyclic imino ether are used as starting materials.

(4) Embodiment in which the aromatic polyester, the bis-cyclic imino ether and a bis-cyclic imino ester are used as starting materials.

(5) Embodiment in which the aromatic polyester containing the bis-cyclic imino ether in the unreacted state and/or in the form of an end blocking agent is used as a starting material.

These embodiments are described in detail below.

EMBODIMENT (1)

As stated hereinbefore, this embodiment embraces a method for reacting the aromatic polyester with the bis-cyclic imino ether in the molten state in a polymerization reactor or a melt-molding machine, or reacting them in the solid phase, to produce an aromatic polyester having an increased degree of polymerization (e.g., as a molding material), or molded articles composed of the aromatic polyester.

This is a typical embodiment of the process of this invention already described hereinabove.

EMBODIMENT (2)

According to this embodiment, the bis-cyclic imino ether used in the reaction is included in a thermoplastic resin in the unreacted state or in the form of an end blocking agent, and the aromatic polyester and the thermoplastic resin are melted to induce the reaction of bonding the terminal carboxyl groups of the aromatic polyester by the cyclic imino ether groups, thereby to produce an aromatic polyester having an increased degree of polymerization or molded articles thereof which contain the aforesaid thermoplastic resin. Accordingly, this method is a so-called master batch method in which a thermoplastic resin containing a large amount of the cyclic imino ether capable of reacting with the terminal carboxyl groups of the aromatic polyester is first prepared, and as required, is mixed in a predetermined amount with the aromatic polyester.

The thermoplastic resin includes, for example, not only aromatic polyesters derived from aromatic dicarboxylic acids as a main acid component and alkylene glycols as a main glycol component, but also aliphatic polyesters derived from aliphatic dicarboxylic acids as a main acid component and alkylene glycols as a main glycol component, polycarbonates, polyamides, polyolefins, polyethers, and polysulfones.

The aliphatic dicarboxylic acids and alkylene glycols may be the same as those exemplified hereinabove. Specific examples of the other thermoplastic resins are polycarbonates derived from 2,2-bis(4-hydroxyphenyl)-propane or 1,1-bis(4-hydroxyphenyl)-cyclohexane; polyolefins such as polyethylene, polypropylene, polystyrene or poly(trimethyl pentene-1); polyamides such as poly-ε-capramide and polyhexamethylene adipamide; and polyethers such as polyoxyethylene glycol or polyoxytetramethylene glycol.

In preparing a master polyester consisting of an aromatic polyester or aliphatic polyester, preferably the former, and the bis-cyclic imino ether, the amount of the bis-cyclic imino ether should be at least equimolar to the equivalent weight of the terminal carboxyl groups of the aromatic polyester.

Thus, there is obtained a master polymer of the aromatic polyester which contains the bis-cyclic imino ether compound of formula [I] in the unreacted state, or contains cyclic imino ether groups in the form of an end blocking agent expressed by the following formula

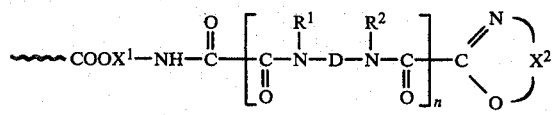

or

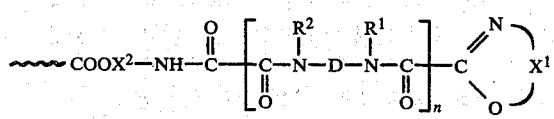

wherein $X^1$, $X^2$, $R^1$, $R^2$ and $n$ are as defined hereinabove, and ∼∼∼ represents the molecular chain of the aromatic polyester,
as a result of reaction with the terminal carboxyl groups of the aromatic polyester.

When other thermoplastic resins than the polyesters are used and they have terminal carboxyl groups capable of reacting with the bis-cyclic imino ether, they may be mixed with each other in the same manner as described above. When the thermoplastic resins do not contain carboxyl groups, a master polymer containing the bis-cyclic imino ether in the unreacted state can be obtained.

Desirably, the master polymer is prepared in a melt-extruder in an inert atmosphere at atmospheric pressure to elevated pressure.

The master polymer so produced is used in an amount corresponding to a predetermined amount of the cyclic imino ether groups, and is mixed and melted with the aromatic polyester having terminal carboxyl groups at a temperature above the melting points of the aromatic polyester and the master polymer, preferably in a melt-molding machine. The mixture is then subjected to the reaction of this invention to afford an aromatic polyester haing an increased degree of polymerization. Molded articles may be produced from the resulting polyester in the molten state.

When other thermoplastic resins than the aromatic polyesters are used as the master polymer, the resulting aromatic polyesters having an increased degree of polymerization or molded articles composed of it contain such other thermoplastic resins.

Generally, when the master polymer is used, it is desirable to include the cyclic imino ether groups in the master polymer in such an amount that the amount of the master polymer is at least 0.1 part by weight per part by weight of the aromatic polyester.

The content of the cyclic imino ether groups is, for example, about 3 to about 100% by weight, preferably about 4 to about 50% by weight, more preferably about 5 to about 30% by weight, calculated as the biscyclic imino ether, based on the thermoplastic resin.

EMBODIMENT (3)

The reaction in accordance with this invention results in the bonding of the terminal carboxyl groups of the aromatic polyester to each other. Hence, an aromatic polyester having a high terminal carboxyl group content is a desirable material in this invention in spite of the fact that the reaction of this invention proceeds rapidly even when the starting aromatic polyester has a low terminal carboxyl group content.

According to this embodiment, therefore, an aromatic polyester having an increased degree of polymerization can be produced from a starting aromatic polyester whose terminal groups are mostly hydroxyl groups, for example an aromatic polyester having a degree of polymerization suitable for fiber formation, such as polyethylene terephthalate having an intrinsic viscosity of at least 0.3, by converting the terminal hydroxyl groups of the aromatic polyester to terminal carboxyl groups to thereby increase its terminal carboxyl group content and cause the reaction of this invention to proceed more rapidly.

In this embodiment, a hydroxyl-terminated, substantially linear, fiber-forming aromatic polyester is reacted with an organic dicarboxylic acid anhydride capable of reacting with the terminal hydroxyl groups of the polyester to form terminal carboxyl groups, and the bis-aromatic imino ether.

Both intramolecular anhydrides and intermolecular anhydrides of organic dicarboxylic acids can be used as the organic dicarboxylic acid anhydrides. They may be any of aliphatic dicarboxylic acid anhydrides, alicyclic dicarboxylic acid anhydrides and aromatic dicarboxylic acid anhydrides.

Examples of the intramolecular anhydrides of such organic dicarboxylic acids include aromatic dicarboxylic acid anhydrides such as phthalic anhydride, 3-methylphthalic anhydride, 3,6-dimethylphthalic anhydride, 4,5-dimethylphthalic anhydride, 1,2-naphthalenedicarboxylic anhydride, and 2,3-naphthalenedicarboxylic anhydride; alicyclic dicarboxylic acid anhydrides such as 1,2,3,6-tetrahydrophthalic anhydride, hexahydrophthalic anhydride, 3,4,5,6-tetrahydrophthalic anhydride, 3-methyl-1,2,3,6-tetrahydrophthalic anhydride, 3-methylhexahydrophthalic anhydride and 1,4- cyclohexanedicarboxylic anhydride; and aliphatic dicarboxylic anhydrides such as succinic anhydride, alpha-methylsuccinic anhydride, α,α-dimethylsuccinic anhydride and α,β-dimethylsuccinic anhydride.

Of these, phthalic anhydride and succinic anhydride are preferred.

The intermolecular anhydrides denotes a linear compound resulting from the formation of an acid anhydride linkage between the molecules of an organic dicarboxylic acid, and is generally called a polyacid anhydride. Preferred examples of such intermolecular anhydrides are polyacid anhydrides of aliphatic dicarboxylic acids such as poly(adipic anhydride), poly(sebacic anhydride), poly(decanedicarboxylic anhydride), poly(dodecanedicarboxylic anhydride), poly[bis-(p-carboxyphenyl)methane anhydride], poly[bis-(p-carboxyphenoxy)-1,3-propane anhydride], and copolymers of these.

Desirably, these poly acid anhydrides have as high a degree of polymerization as possible. Generally, they have a degree of polymerization of about 5 to about 100.

The organic dicarboxylic acid anhydride is used in an amount of 0.1 to 10% by weight, preferably 0.2 to 5% by weight, especially preferably 0.3 to 3% by weight, based on the aromatic polyester.

According to this embodiment, it is desirable that the reaction between the organic dicarboxylic acid anhydride and the aromatic polyester should be performed before, or simultaneously with, the reaction between the aromatic polyester and the bis-cyclic imino ether.

Generally, therefore, there is employed a method in which the bis-cyclic imino ether is added after the organic dicarboxylic acid anhydride has been added to the aromatic polyester, or the organic dicarboxylic acid anhydride and the bis-cyclic imino ether are simultaneously added to the aromatic polyester.

The simultaneous addition of the organic dicarboxylic acid anhydride and the bis-cyclic imino ether may be performed either in a polycondensation reactor or in an extrusion molding machine. The addition of the bis-cyclic imino ether after the addition of the organic dicarboxylic acid anhydride can also be effected in a polycondensation reactor or in an extrusion molding machine. Alternatively, it is possible to add the organic dicarboxylic acid anhydride to the polycondensation reactor, and then the bis-cyclic imino ether in the extrusion molding machine.

Generally, in adding the organic dicarboxylic acid and the bis-cyclic imino ether at the same time, they may be added as a mixture or separately when the organic dicarboxylic acid anhydride is an intramolecular anhydride. When the organic dicarboxylic acid anhydride is an intermolecular anhydride, they are preferably added separately to the reaction system at the same time.

Thus, according to this embodiment, the carboxyl groups formed by the reaction of the aromatic polyester with the organic dicarboxylic acid anhydride and the carboxyl groups inherently possessed by the aromatic polyester react with the bis-cyclic imino ether to rapidly produce an aromatic polyester having an increased degree of polymerization.

EMBODIMENT (4)

The reaction in accordance with this invention causes the bonding of the terminal carboxyl groups of the aromatic polyester to each other to rapidly give an aromatic polyester having an increased degree of polymerization.

As can be readily appreciated, the reaction of this invention gives an aromatic polyester substantially free from terminal carboxyl groups, but cannot give an aromatic polyester having a more increased degree of polymerization.

Since, however, an aromatic polyester generally contains terminal hydroxyl groups in addition to terminal carboxyl groups, the terminal hydroxyl groups are present in a sufficient concentration even after the terminal carboxyl groups have been consumed as above by the reaction of this invention.

Thus, according to this embodiment, an aromatic polyester having an increased degree of polymerization can be produced advantageously by performing the reaction of bonding the molecular chains of the aromatic polyester to each other by its terminal hydroxyl groups which was previously suggested by the present inventors, simultaneously with the reaction of this invention of bonding the molecular chains of the aromatic polyester to each other by its terminal carboxyl groups.

According to this embodiment, a substantially linear and fiber-forming aromatic polyester having both terminal hydroxyl groups and terminal carboxyl groups is reacted with the bis-cyclic imino ether of formula [I] above and a bis-cyclic imino ester of formula [II] or [III] below

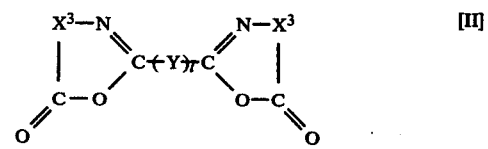

wherein Y represents a divalent hydrocarbon group optionally containing a hetero atom, $X^3$ represents a divalent hydrocarbon group non-reactive under the reaction conditions and having 1 or 2 carbon atoms as members of the imino ester ring, and l is 0 or 1, or

wherein A represents a group of the formula [III]-a or [III]-b

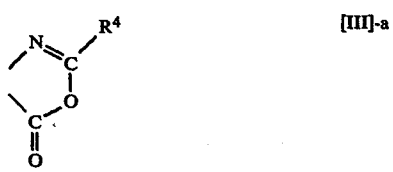

wherein $R^4$ represents a monovalent hydrocarbon group, or

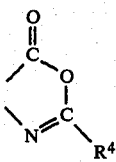

[III]-b wherein R⁴ is as defined above; R represents a tetravalent aromatic group optionally containing a hetero atom, and R³ and R⁴ are identical or different and each represents a monovalent hydrocarbon group.

These bis-cyclic imino esters are disclosed in U.S. Patent Application Ser. No. 133,797 filed Mar. 25, 1980 and EPC Patent Application No. 80101600.7 filed Mar. 26, 1980 by the present inventors. Accordingly, these applications are cited herein as references.

In formula [II], Y is a divalent hydrocarbon group optionally containing a hetero atom, and examples are the same as those exemplified with regard to D in formula [I].

$X^3$ in formula [II] is a divalent hydrocarbon group having 1 or 2 ring-member carbon atoms, for example methylene, ethylene and ortho-phenylene and groups resulting from the substitution of the above-exemplified groups by non-reactive substituents.

In formula [III], R is a tetravalent aromatic group optionally containing a hetero atom. Examples are monocyclic, fused ring, or polycyclic groups of the formulae

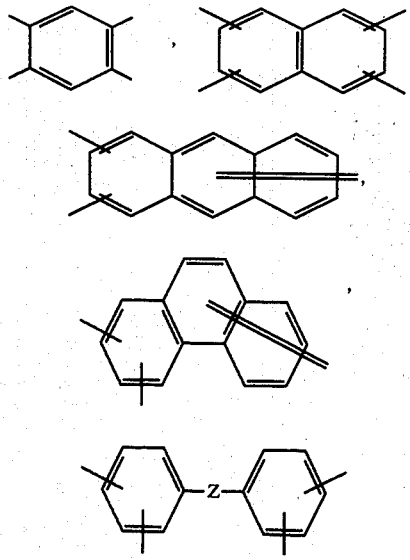

wherein Z is —O—, —CO—, —S—, —SO₂—, —CH₂—, —CH₂CH₂—, or —C(CH₃)₂— and groups resulting from the substitution of the aforesaid groups by non-reactive substituents.

R³ or R⁴ is a monovalent hydrocarbon group, and examples of such a group are the same as those exemplified with regard to R¹ or R² in formula [I] above.

Especially preferred examples of the compounds of formula [II] or [III] include 2,2'-bis(3,1-benzoxazin-4-one), 2,2'-p-phenylenebis[4,4-dimethyl-5(4H)-oxazolone], 2,2'-m-phenylenebis[4,4-dimethyl-5-(4H)-oxazolone], 2,2'-p-phenylenebis(3,1-benzoxazin-4-one), 2,2'-p-phenylenebis[4-isobutyl-5(4H)-oxazolone], 2,8-dimethyl-4H,6H-benzo[1,2-d: 5,4-d']bis(3,1)oxazine-4,6-dione, and 2,7-dimethyl-4H, 9H-benzo[1,2-d:4,5-d']bis(1,3)oxazine-4,9-dione.

These bis-cyclic imino esters are used in an amount of 0.05 to 2 moles, preferably 0.1 to 1 mole, per equivalent of the terminal hydroxyl groups of the aromatic polyester.

The bis-cyclic imino ester reacts with the aromatic polyester under substantially the same reaction conditions as in the reaction of the bis-cyclic imino ether of formula [I]. Accordingly, the reaction conditions of this invention described in section [C] above, such as the reaction temperature, the atmosphere in which the reaction is carried out, the state of the reaction system (solid state or molten state) or the apparatus for performing the reaction, are applicable to the reaction between the bis-cyclic imino ester and the aromatic polyester.

According to this embodiment, the reaction of the bis-cyclic imino ether and the reaction of the bis-cyclic imino ester can be performed in any desired sequence because these reactions involve different reactants (carboxyl groups on one hand, and hydroxyl groups on the other), and much the same reaction conditions can be used for both. For example, it is possible to perform the reaction of the bis-cyclic imino ether with the aromatic polyester and then to perform the reaction of the bis-cyclic imino ester with the aromatic polyester, or vice versa. Or these reactions may be performed concurrently.

Of course, these reactions can be performed in a polymerization reactor or in a melt molding machine, as required.

Thus, this embodiment has the advantage that an aromatic polyester having a more increased degree of polymerization can be produced by reacting an aromatic polyester having an increased degree of polymerization and being almost free from terminal carboxyl groups, which is obtained by bonding the molecular chains of an aromatic polyester to each other by the bis-cyclic imino ether, with the bis-cyclic imino ester at the terminal hydroxyl groups of the polyester.

More specifically, when, for example, the reaction with the terminal carboxyl groups alone can convert an aromatic polyester having an average degree of polymerization of 100 to an aromatic polyester having an average degree of polymerization of 200 at the highest. The reaction with the terminal hydroxyl groups according to this embodiment can give an aromatic polyester having an average degree of polymerization of, for example, 250.

EMBODIMENT (5)

According to this invention, an aromatic polyester containing the bis-cyclic imino ether in the unreacted state or in the form of an end blocking agent is first prepared by pre-mixing, and then the resulting aromatic polyester is maintained at an elevated temperature.

This embodiment can be advantageously used when it is desired to produce an aromatic polyester molding material containing the bis-cyclic imino ether in the unreacted state or in the form of an end blocking agent by mixing the aromatic polyester and the bis-cyclic imino ether in the molten state within a very short period of time (for example, by feeding the bis-cyclic imino ether to a point near the extrusion outlet of a melt-molding machine), or to produce a molded article of an aromatic polyester containing the bis-cyclic imino ether in the unreacted state or in the form of an end blocking agent by first producing a molded article of the aromatic polyester and then contacting the molded article with the bis-cyclic imino ether.

Many experiments conducted by the present inventors have led to the discovery that such pre-mixing in the former can be achieved by mixing the polyester and the bis-cyclic imino ether so that the mixing temperature (T, °C.) and the mixing time (t, second) have the relation expressed by the following equations.

$$\log t \leq -0.008T + 4.8$$

preferably $$\log t \leq -0.008T + 4.4$$

more preferably $$\log t \leq -0.008T + 4.2$$

above all $$\log t \leq -0.008T + 4.0.$$

Thus, according to the aforesaid pre-mixing method, there can be obtained a pre-mixed polymer containing the cyclic imino ether groups in a proportion of at least 10 equivalents/$10^6$ g of polymer, preferably at least 20 equivalents/$10^6$ g of polymer, more preferably at least 30 equivalents/$10^6$ g of polymer.

The content of the cyclic imino ether groups of the resulting pre-mixed polymer is determined from a calibration curve prepared in advance from the data obtained by dissolving the pre-mixed polymer in a phenol/tetrachloroethane mixed solvent containing about 0.001 N of p-toluenesulfonic acid and titrating the solution with a benzyl alcohol-containing sodium hydroxide solution using Tropaeolin 00. as an indicator.

In the case of the former, an aromatic polyester molding material having not too high a degree of polymerization is used, for example. Hence, in remelting it for molding, a molded article of an aromatic polyester having an increased degree of polymerization can be produced without involving the difficulty of molding which is due to the excessively high melt viscosity of the polymer.

This method is significant in practice because the molded article manufacturers can easily apply the process of this invention to the production of molded articles from molding materials purchased from the suppliers.

Likewise, the latter also has the advantage that a molded article of aromatic polyester having an increased degree of polymerization can be produced by first producing a molded article from an aromatic polyester which is relatively easy to melt-mold and has a relatively low degree of polymerization, and then contacting the molded article with the bis-cyclic imino ether, followed by heating to a temperature at which the molded article does not deform.

The bis-cyclic imino ethers can be contacted in the molten state or the gaseous state, or as a solution in an organic solvent with the aromatic polyester, and the operation of contacting is easy.

The latter method is also significant in practice. For example, it can be applied to the production of fibers, films, etc. composed of an aromatic polyester having an increased degree of polymerization by after-treating fibers, films, etc. composed of an aromatic polyester with the bis-cyclic imino ether or to the production of a molded article having an increased degree of polymerization only in the surface layer, preferably composed of an aromatic polyester having a low terminal carboxyl group content.

Thus, the present invention provides an aromatic polyester having an increased degree of polymerization and preferably a low terminal carboxyl group content as a result of the bonding of the molecular chains of an aromatic polyester to each other by its terminal carboxyl groups under the action of the bis-cyclic imino ether, and molded articles composed of the aforesaid aromatic polyester.

The aromatic polyester obtained by the present invention can be fabricated into various articles, for example fibers, films, tubes, sheets, receptacles, machine component parts (automobiles, electrical applicances, machinery, therapeutic instruments, etc.), and miscellaneous household and industrial articles. These molded articles may also be foamed ones. Among these articles, the fibers may find applications in apparel, rubber structure reinforcing materials (tire cords, belt materials, etc.), and industrial materials such as fishing nets and filter materials, and the films are useful for magnetic recording, electrical insulation, packaging, agriculture (for green houses), lamination, etc.

These articles of aromatic polyester can be produced by techniques and operations which are known in the production of molded articles from aromatic polyesters. For example, they can be produced by extrusion molding, injection molding, compression molding, etc.

Taking up the production of fibers as an example, the aromatic polyester is melt-spun at a temperature of, for example, 280° to 340° C. In the case of an aromatic polyester having a high intrinsic viscosity of at least about 0.8, such as polyethylene terephthalate, the melt-spinning is carried out by using a spinning cylinder having a heating area at 290° to 400° C. immediately below the spinneret. The resulting undrawn filaments at 70° to 100° C. in a first stage and at 180° to 230° C. in a second stage so that the total draw ratio in the first and second stages is 4 to 6 times. The drawn filaments are usually heat-treated at a temperature higher than the drawing temperature.

As another example, a film may be produced by melting the aromatic polyester and forming it into a film at a temperature of, for example, 260° to 340° C., and the resulting undrawn film is wound up as a final product. Or the undrawn film is stretched to 2.5 to 5.0 times, preferably 2.8 to 4.5 times, in the advancing direction of the film at a temperature of 70° to 120° C., and if required, further stretched to 2.5 to 5.0 times, preferably 2.8 to 4.5 times, in a direction at right angles to the advancing direction of the film. If further required, the stretched film is heat-set at a temperature of 110° to 240° C., preferably 120° to 230° C.

If desired, the molded articles of the aromatic polyester obtained by the process of this invention may contain reinforcing materials, fillers, fire retardants, fire-retarding assistants, antioxidants, heat stabilizers, light stabilizers, plasticizers, lubricants, antistatic agents, nucleating agents, mold releasing agents, coloring agents, etc. The reinforcing materials are, for example, fibrous materials such as glass fibers, asbestos fibers, carbon fibers and potassium titanate fibers, and small flaky materials such as glass flakes and mica. The other additives mentioned above are well known in the field of aromatic polyester articles.

As stated in detail hereinabove, the present invention affords rapidly aromatic polyesters having an increased degree of polymerization and preferably a lower carboxyl group content, and molded articles composed of such aromatic polyesters.

Accordingly, the process of this invention does not in any way limit the absolute value of the degree of polymerization of aromatic polyesters. For example, according to the process of this invention, polyethylene terephthalate having a high degree of polymerization corresponding to an intrinsic viscosity of, for example, 1.1 (degree of polymerization about 215) and a lower carboxyl group content of 5 eq/$10^6$ g of polymer can be obtained from polyethylene terephthalate having an intrinsic viscosity of 0.75 (degree of polymerization about 130) and a carboxyl group content of 36 eq/$10^6$ g of polymer by performing the aforesaid reaction at 290° C. for 3 minutes in a melt-molding machine. As can be appreciated from this fact, the process of this invention is advantageously applicable to the production of aromatic polyesters having an increased degree of polymerization and a low carboxyl group content.

The following Examples and Comparative Examples illustrate the present invention in more detail. It should be understood however that the invention is in no way limited to these specific examples.

In these examples, all parts are by weight, and the contents of terminal carboxyl groups and terminal hydroxyl groups of aromatic polyesters were measured by the method of A. Conix described in Makromol. Chem. 26, 226 (1958).

EXAMPLES 1 TO 7 AND COMPARATIVE EXAMPLES 1 AND 2

One hundred parts of dry chips of polytetramethylene terephthalate having the intrinsic viscosities and terminal carboxyl group contents shown in Table 1 were dry-blended in a V-type mixer with predetermined amounts of the bis-cyclic imino ethers shown in Table 1. The resulting mixture was melt-extruded by an extruder at each of the temperatures shown in Table 1 with an average residence time of about 3 minutes. The intrinsic viscosities and terminal carboxyl group contents of the polymers after extrusion as shown in Table 1. Substantially no coloration was caused to the polymers.

For comparison, Table 1 also shows the intrinsic viscosities of the polymers obtained by the above procedure except that no bis-cyclic imino ether was added. It is seen from the results that the bis-cyclic imino ether reacted with the polyester during the extruding operation to increase its degree of polymerization greatly within a short period of time.

TABLE 1

| Example (Ex.) and Comparative Example (CEx.) | Polytetramethylene terephthalate | | bis-cyclic imino ether | | Extruding temperature (°C.) | Polymer after extrusion | |
|---|---|---|---|---|---|---|---|
| | Intrinsic viscosity | Terminal COOH content (eq/$10^6$ g) | Type | Amount (parts) | | Intrinsic viscosity | Terminal COOH content (eq/$10^6$ g) |
| Ex. 1 | 0.69 | 66 | 2,2'-bis(2-oxazoline) | 0.5 | 240 | 1.02 | 12 |
| Ex. 2 | 0.69 | 66 | 2,2'-bis(2-oxazoline) | 0.8 | 240 | 1.10 | 8 |
| Ex. 3 | 0.69 | 66 | 2,2'-bis(2-oxazoline) | 1.0 | 240 | 1.12 | 7 |
| Ex. 4 | 0.69 | 66 | 2,2'-bis(5,6-dihydro-4H-1,3-oxazine) | 0.8 | 240 | 1.05 | 10 |
| CEx. 1 | 0.69 | 66 | None | — | 240 | 0.67 | 69 |
| Ex. 5 | 0.74 | 49 | N,N'-hexamethylene-bis(2-carbamoyl-2-oxazoline) | 0.8 | 260 | 1.02 | 10 |
| Ex. 6 | 0.74 | 49 | N,N'-tetramethylene-bis(2-carbamoyl-2-oxazoline) | 0.8 | 260 | 1.10 | 8 |
| Ex. 7 | 0.74 | 49 | N,N'-hexamethylene-bis(2-carbamoyl-5,6-dihydro-4H-1,3-oxazine) | 1.0 | 260 | 1.12 | 8 |
| CEx. 2 | 0.74 | 49 | None | — | 260 | 0.72 | 55 |

EXAMPLES 8 TO 14 AND COMPARATIVE EXAMPLES 3 AND 4

One hundred parts of dry chips of polyethylene terephthalate having each of the intrinsic viscosities and terminal carboxyl group contents shown in Table 2 were dry-blended in a V-type mixer with each of the cyclic imino ether compounds shown in Table 2. The resulting mixture was melt-extruded by an extruder at each of the temperatures shown in Table 2 with each of the average residence times shown in Table 2. The intrinsic viscosities and terminal carboxyl group contents of the polymers after extrusion are shown in Table 2. No substantial coloration was caused to the polymers.

For comparison, Table 2 also shows the intrinsic viscosities and terminal carboxyl group contents of the polymers obtained by the same procedure as above except that no bis-cyclic imino ether compound was used. It is seen from the results obtained that the bis-cyclic imino ether compounds of this invention react with the polyesters during the extruding operation to greatly increase their degrees of polymerization within a short period of time and reduce the terminal carboxyl group content of the polymers.

TABLE 2

| Example (Ex.) or Comparative Example (CEx.) | Polyethylene terephthalate Intrinsic viscosity | Polyethylene terephthalate Terminal COOH content (eq/10⁶ g) | bis-cyclic imino ether Type | bis-cyclic imino ether Amount (parts) | Extruding conditions Temperature (°C) | Extruding conditions Average residence time (min.) | Polymer after extrusion Intrinsic viscosity | Polymer after extrusion Terminal carboxyl group content (eq/10⁶ g) |
|---|---|---|---|---|---|---|---|---|
| Ex. 8 | 0.75 | 36 | 2,2'-bis(2-oxazoline) | 0.5 | 290 | ca. 3 | 1.02 | 8 |
| Ex. 9 | 0.75 | 36 | 2,2'-bis(2-oxazoline) | 0.8 | 290 | ca. 3 | 1.1 | 5 |
| Ex. 10 | 0.75 | 36 | 2,2'-bis(5,6-dihydro-4H-1,3-oxazine) | 0.8 | 290 | ca. 3 | 1.07 | 7 |
| CEx. 3 | 0.75 | 36 | None | — | 290 | ca. 3 | 0.73 | 42 |
| Ex. 11 | 0.71 | 36 | N,N'-hexamethylene-bis-(2-carbamoyl-2-oxazoline) | 0.6 | 290 | ca. 2 | 0.91 | 9 |
| Ex. 12 | 0.71 | 36 | N,N'-hexamethylene-bis(2-carbamoyl-2-oxazoline) | 0.9 | 290 | ca. 2 | 0.95 | 5 |
| Ex. 13 | 0.71 | 36 | N,N'-ethylenebis(2-carbamoyl-2-oxazoline) | 0.5 | 290 | ca. 2 | 0.92 | 6 |
| Ex. 14 | 0.71 | 36 | N,N'-ethylenebis(2-carbamoyl-5,6-dihydro-4H-1,3-oxazine) | 0.5 | 290 | ca. 2 | 0.91 | 7 |
| CEx. 4 | 0.71 | 36 | None | — | 290 | ca. 2 | 0.69 | 40 |

EXAMPLE 15

One hundred parts of polyhexamethylene terephthalate having an intrinsic viscosity of 0.68 and a terminal carboxyl group content of 67 eq/10⁶ g of polymer was melted at 250° C. in a stream of nitrogen gas, and then reacted with 0.6 part of 2,2'-bis(2-oxazoline) with stirring. The intrinsic viscosity of the polymer was 0.96 in 2 minutes, 1.08 in 5 minutes, and 1.12 in 10 minutes. In 10 minutes, the polymer had a carboxyl group content of 12 eq/10⁶ g.

EXAMPLE 16

One hundred parts of modified polyethylene terephthalate having 15 mole %, based on the total acid component, of isophthalic acid copolymerized therewith (intrinsic viscosity 0.65; terminal carboxyl group content 67 eq/10⁶ g) was melted at 270° C. in a glass vessel in a stream of nitrogen, and reacted with 1.0 part of 2,2'-bis(2-oxazoline) with stirring. The intrinsic viscosity of the polymer was 0.84 in 2 minutes, and 0.92 in 5 minutes. In 5 minutes, the carboxyl group content of the polymer was 9 eq/10⁶ g.

EXAMPLES 17 TO 20 AND COMPARATIVE EXAMPLES 5 TO 8

One hundred parts of dry chips of polyethylene terephthalate having each of the intrinsic viscosities and terminal carboxyl group contents shown in Table 3 were dry-blended with a predetermined amount of 2,2'-bis(2-oxazoline). The mixture was dried, and melt extruded by a twin-screw extruder at 275° C. with an average residence time of about 3 minutes. The intrinsic viscosities and terminal carboxyl group contents of the polymers obtained are shown in Table 3.

For comparison, each of the polymers was melt-extruded in the same way as above except that the 2,2'-bis(2-oxazoline) was not added. The results are also shown in Table 3.

TABLE 3

| Example (Ex.) or Comparative Example (CEx.) | Polyethylene terephthalate Intrinsic viscosity | Polyethylene terephthalate Terminal COOH content (eq/10⁶ g) | Amount of 2,2'-bis(2-oxazoline) (parts) | Properties of the extruded polymer Intrinsic viscosity | Properties of the extruded polymer Terminal COOH content (eq.10⁶ g) |
|---|---|---|---|---|---|
| Ex. 17 | 0.61 | 33 | 0.6 | 0.71 | 4 |
| CEx. 5 | 0.61 | 33 | 0 | 0.57 | 42 |
| Ex. 18 | 0.74 | 43 | 0.7 | 1.04 | 6 |
| CEx. 6 | 0.74 | 43 | 0 | 0.69 | 50 |
| Ex. 19 | 0.73 | 31 | 0.6 | 0.91 | 5 |
| CEx. 7 | 0.73 | 31 | 0 | 0.69 | 48 |
| Ex. 20 | 0.65 | 24 | 0.3 | 0.70 | 3 |
| CEx. 8 | 0.65 | 24 | 0 | 0.59 | 38 |

EXAMPLES 21 to 24 AND COMPARATIVE EXAMPLES 9 TO 12

A predetermined amount of 2,2'-bis(5,6-dihydro-4H-1,3-oxazine) was added to 100 parts of chips of polyethylene terephthalate having each of the intrinsic viscosities and terminal carboxyl group contents shown in Table 4 and they were dry-blended and dried. The mixture was melt extruded by a twin-screw extruder at 280° with an average residence time of about 2.5 minutes. The intrinsic viscosities and terminal carboxyl group contents of the extruded polymers are shown in Table 4.

The above procedure was repeated except that the 2,2'-bis(5,6-dihydro-4H-1,3-oxazine) was not added. The results are also shown in Table 4.

TABLE 4

| Example (Ex.) or Comparative Example (CEx.) | Polyethylene terephthalate Intrinsic viscosity | Polyethylene terephthalate Terminal COOH content (eq/10⁶ g) | Amount of 2,2'-bis-(5,6-dihydro-4H-1,3-oxazine) (parts) | Properties of the extruded polymer Intrinsic viscosity | Properties of the extruded polymer Terminal COOH (eq/10⁶ g) |
|---|---|---|---|---|---|
| Ex. 21 | 0.64 | 32 | 0.5 | 0.74 | 10 |
| CEx. 9 | 0.64 | 32 | 0 | 0.58 | 40 |
| Ex. 22 | 0.73 | 38 | 0.7 | 0.91 | 11 |
| CEx. 10 | 0.73 | 38 | 0 | 0.68 | 46 |
| Ex. 23 | 0.76 | 33 | 0.6 | 0.93 | 13 |

TABLE 4-continued

| Example (Ex.) or Comparative Example (CEx.) | Polyethylene terephthalate | | Amount of 2,2'-bis-(5,6-dihydro-4H-1,3-oxazine) (parts) | Properties of the extruded polymer | |
|---|---|---|---|---|---|
| | Intrinsic viscosity | Terminal COOH content (eq/$10^6$ g) | | Intrinsic viscosity | Terminal COOH (eq/$10^6$ g) |
| CEx. 11 | 0.76 | 33 | 0 | 0.69 | 49 |
| Ex. 24 | 0.66 | 27 | 0.4 | 0.75 | 8 |
| CEx. 12 | 0.66 | 27 | 0 | 0.59 | 41 |

EXAMPLE 25

One hundred parts of dry chips of modified polyethylene terephthalate having 15 mole%, based on the total acid component, of isophthalic acid copolymerized therewith (intrinsic viscosity 0.68; terminal carboxyl group content 29 eq/$10^6$ g) were melted in a stream of nitrogen at 280° C., and then reacted with 0.8 part of N,N'-hexamethylenebis(2-carbamoyl-2-oxazoline) with stirring. The intrinsic viscosity of the polymer was 0.84 in 2 minutes, and 0.90 in 5 minutes. The terminal carboxyl group content of the polymer was 9 eq/$10^6$ g in 2 minutes, and 5 eq/$10^6$ g in 5 minutes.

EXAMPLE 26

One hundred parts of chips of polyethylene terephthalate having an intrinsic viscosity of 0.69 and a terminal carboxyl group content of 45 eq/$10^6$ g were dry-blended with 0.7 part of N,N'-tetramethylenebis(2-carbamoyl-2-oxazoline). The mixture was melt-extruded by an extruder at about 265° C. with an average residence time of about 1 minute to form a molding material (pellets) containing unreacted imino ether groups. The pellets had an intrinsic viscosity of 0.83 and a terminal carboxyl group content of 16 eq/$10^6$ g.

The pellets were then dried, and extrusion molded at an extruding temperature of 295° C. with a residence time of about 1 minute. The resulting molded product (tube) has an intrinsic viscosity of 0.91 and a terminal carboxyl group content of 7 eq/$10^6$ g.

EXAMPLE 27

One hundred parts of dry pellets of polyethylene terephthalate having an intrinsic viscosity of 0.72 and a terminal carboxyl group content of 33 eq/$10^6$ g were dry-bleneed with 0.4 part of 2,2'-bis(2-oxazoline). The resulting mixture was extruded by a twin-screw extruder at a temperature of 285° C. on an average with an average residence time of 2 minutes to form pellets having a size of 4 mm×4 mm×2 mm. The resulting pellets had an intrinsic viscosity of 1.01 and a terminal carboxyl group content of 5 eq/$10^6$ g. The concentration of cyclic imino ether groups in the pellets was 0.15% calculated as the unreacted 2,2'-bis(2-oxazoline).

The resulting polyethylene terephthalate pellets were heat-treated at 160° C. for 4 hours. After the heat-treatment, the pellets had an intrinsic viscosity of 1.05 and a terminal carboxyl group content of 2 eq/$10^6$ g.

The heat-treated polyethylene terephthalate pellets were extruded from a spinneret having orifices with a diameter of 0.5 mm using an extruder at about 290° C. with an average residence time of 3 minutes. The undrawn filaments were drawn to 5.5 times at 80° C., and then heat-treated at 210° C. The drawn filaments had an intrinsic viscosity of 0.99, a carboxyl group content of 4 eq/$10^6$ g, a tenacity of 5.6 g/de and an elongation of 28%.

EXAMPLES 28 TO 30

Example 27 was repeated except that the heat-treatment was performed under the conditions shown in Table 5. The properties of the filaments obtained are shown in Table 5.

TABLE 5

| | | Properties of the filaments | | |
|---|---|---|---|---|
| Example | Heat-treatment conditions | Intrinsic viscosity | Terminal COOH content (eq/$10^6$ g) | Tenacity (g/de) |
| 28 | at 180° C. for 4 hours (dried in vacuo 10 mmHg) | 1.02 | 3 | 5.6 |
| 29 | at 60° C. for 24 hours | 1.00 | 5 | 5.6 |
| 30 | at 60° C. for 8 hours | 0.96 | 6 | 5.5 |

EXAMPLE 31 AND COMPARATIVE EXAMPLE 13

To one hundred parts of chips (4×4×2 mm) of polytetramethylene terephthalate having an intrinsic viscosity of 0.73 and a terminal carboxyl group content of 38 eq/$10^6$ g was adhered 0.2 part of powdery 2,2'-bis(2-oxazoline), and the polymer chips were heated at atmospheric pressure in a stream of nitrogen gas for 3 hours. The intrinsic viscosity and the terminal carboxyl group content of the resulting polymer are shown in Table 6.

For comparison, the above procedure was repeated except that no bis-oxazoline was used. The results are also shown in Table 6.

TABLE 6

| | Resulting polymer | |
|---|---|---|
| | Intrinsic viscosity | Terminal COOH content (eq/$10^6$ g) |
| Example 31 | 1.11 | 12 |
| Comparative Example 13 | 0.80 | 35 |

EXAMPLES 32 AND 33 AND COMPARATIVE EXAMPLE 14

Powdery 2,2'-bis(2-oxazoline) was adhered in each of the amounts indicated in Table 7 to 100 parts of chips (4×4×2 mm) of polyethylene terephthalate having an intrinsic viscosity of 0.80 and a terminal carboxyl group content of 38 eq/$10^6$, and the chips were heated at 230° C. at atmospheric pressure for 1 hour in a stream of nitrogen gas. The intrinsic viscosities and terminal carboxyl group contents of the polymers are shown in Table 7.

For comparison, the above procedure was repeated except that no bis-oxazoline was used. The results are also shown in Table 7.

TABLE 7

| | Amount of 2,2'-bis-(2-oxazoline) (parts) | Resulting polymer | |
|---|---|---|---|
| | | Intrinsic viscosity | Terminal COOH content (eq/$10^6$ g) |
| Example 32 | 0.2 | 1.02 | 19 |
| Example 33 | 1.0 | 1.18 | 15 |
| Compara- | | | |

TABLE 7-continued

| | Resulting polymer | |
|---|---|---|
| Amount of 2,2'-bis-(2-oxazoline) (parts) | Intrinsic viscosity | Terminal COOH content (eq/$10^6$ g) |
| tive Example 14    0 | 0.81 | 35 |

EXAMPLE 34 AND COMPARATIVE EXAMPLE 15

One hundred parts of chips (4×4×2 mm) of polyethylene terephthalate having an intrinsic viscosity of 0.65 and a terminal carboxyl group content of 43 eq/$10^6$ g were placed into a reactor equipped with a vacuum device, and maintained at a reduced pressure of 215 mmHg while passing nitrogen gas at 180° C., and heated to 235° C. over the course of 3 hours. Over a period of one hour from the time when the temperature reached 235° C., 0.15 part of a sublimation product of 2,2'-bis(2-oxazoline) was introduced into the reactor using nitrogen gas as a carrier. The resulting polymer had an intrinsic viscosity of 0.83 and a terminal carboxyl group content of 25 eq/$10^6$ g.

For comparison, the above procedure was repeated except that 2,2'-bis(2-oxazoline) was not used. The resulting polymer had an intrinsic viscosity of 0.67 and a terminal carboxyl group content of 35 eq/$10^6$ g.

EXAMPLES 35 TO 38 AND COMPARATIVE EXAMPLE 16

Each of the bis-cyclic imino ether shown in Table 8 was dry-blended with 100 parts of pellets of polyethylene terephthalate having an intrinsic viscosity of 0.70 and a terminal carboxyl group content of 36 eq/$10^6$ g. The mixture was injection molded into a sheet-like article having a thickness of about 2 mm at an injecting temperature of 270° C. and a mold temperature of about 140° C. The intrinsic viscosity, terminal carboxyl group content and cyclic imino ether group content of the molded article are shown in Table 8. The molded articles was heat-treated at 230° C. for each of the time periods shown in Table 8, and the intrinsic viscosity and terminal carboxyl group content of the final product were measured. The results are shown in Table 8.

For comparison, the above procedure was repeated except that the bis-cyclic imino ether was not added. The results are also shown in Table 8.

ity and increased in terminal carboxyl group content as a result of heat-treatment, the polyesters heat-treated in accordance with this invention increased in intrinsic viscosity and decreased in terminal carboxyl group content.

EXAMPLES 39 AND 40 AND COMPARATIVE EXAMPLE 17

A sheet of polytetramethylene terephthalate (intrinsic viscosity 0.88; terminal carboxyl group content 54 eq/$10^6$ g) having a thickness of about 500 microns was dipped in about 5% solution of each of the bis-cyclic imino ether compounds shown in Table 9 in each of the solvents shown in Table 9 at the refluxing temperature of the solvent for 30 minutes. The sheet was then withdrawn and dried. The imino ether group content of the sheet was measured. The results are shown in Table 9. The sheet was then heat-treated in a stream of nitrogen gas at 210° C. for 30 minutes. The intrinsic viscosity and terminal carboxyl group content of the treated sheet are shown in Table 9.

For comparison, the above procedure was repeated except that the solution of the bis-cyclic imino ether was not used. The results are also shown in Table 9.

TABLE 9

| | | | Cyclic imino ether group content (eq/$10^6$ g) | Properties of the sheet | |
|---|---|---|---|---|---|
| | bis-cyclic imino ether | Solvent | | Intrinsic viscosity | Terminal COOH content (eq/$10^6$ g) |
| Example 39 | 2,2'-bis(2-oxazoline) | Dioxane | 63 | 1.18 | 8 |
| Example 40 | N,N'-hexamethylenebis-(2-carbamoyl-2-oxazoline) | Xylene | 65 | 1.09 | 9 |
| Comparative Example 17 | None | None | 0 | 0.89 | 54 |

It is seen from Table 9 that the sheet treated in accordance with this invention markedly increased in intrinsic viscosity and decreased in terminal carboxyl group content.

EXAMPLE 41

Drawn filaments of polyethylene terephthalate (intrinsic viscosity 0.69; terminal carboxyl group content

TABLE 8

| Example (Ex.) or Comparative Example (CEx.) | Molded article (before heat-treatment) | | | | Heat-treating time (minutes) | Molded article (after heat-treatment) | |
|---|---|---|---|---|---|---|---|
| | bis-cyclic imino ether | | Intrinsic viscosity | Terminal COOH content (eq/$10^6$ g) | Cyclic imino ether group content (eq/$10^6$ g) | | |
| | Type | Amount (parts) | | | | Intrinsic viscosity | Terminal COOH content (eq/$10^6$ g) |
| Ex. 35 | 2,2'-bis(2-oxazoline) | 0.8 | 0.77 | 11 | 61 | 120 | 0.97 | 2 |
| Ex. 36 | " | 0.6 | 0.75 | 14 | 42 | 40 | 0.93 | 4 |
| Ex. 37 | 2,2'-bis(5,6-dihydro-4H-1,3-oxazine) | 0.8 | 0.73 | 13 | 51 | 100 | 0.90 | 4 |
| Ex. 38 | 2,2'-bis(5,6-dihydro-4H-1,3-oxazine) | 0.6 | 0.72 | 17 | 36 | 60 | 0.86 | 6 |
| CEx. 16 | None | 0 | 0.66 | 44 | 0 | 100 | 0.64 | 48 |

It is seen from Table 8 that while the polyester in Comparative Example 16 decreased in intrinsic viscos- 32 eq/$10^6$ g) were dipped in an about 5% dioxane solution of 2,2'-bis(2-oxazoline) at the refluxing temperature of dioxane for 1 hour. The filaments were withdrawn, washed with water and dried. The stretched filaments so treated were found to have a bis-cyclic imino ether group content of 51 eq/$10^6$ g. When the stretched filaments were then heat-treated in air at 220° C. for 60 minutes, their intrinsic viscosity increased to 0.77 and their terminal carboxyl group content decreased to 10 eq/$10^6$ g.

When the above procedure was repeated except that the dioxane solution was not used. The intrinsic viscosity of the filaments decreased to 0.65, and their terminal carboxyl group content increased to 37 eq/$10^6$ g.

EXAMPLES 42 TO 44

One hundred parts of chips of polyethylene terephthalate chips having an intrinsic viscosity of 0.75 and a terminal carboxyl group content of 35 eq/$10^6$ g were dry-blended with 0.5 part of 2,2'-bis(2-oxazoline). The mixture was melt-spun by a spinning machine having a spinning mantle with a heating zone immediately below a spinneret having 250 orifices with a diameter of 0.6 mm to form undrawn filaments (8500 de/250 fil) at a melting temperature of 300° C. at a take-up speed of 540 meters/min. The amount of the filaments extruded was 510 g/min.

The undrawn filaments were drawn first to 3.55 times at 90° C., and then to 1.60 times at 200° C., and then heat-treated at 220° C. under tension to form drawn filaments (1500 de/250 fil). The drawn filaments had an intrinsic viscosity of 0.90 and a terminal carboxyl group content of 8 eq/$10^6$ g.

The drawn filaments (1500 de/250 fil) were given a Z twist of 400 turns/m. Two twisted filament yarns were plied and given an S twist of 400 turns/m to form a raw cord (1500×2 de). The raw cord was dipped in a resorcinol-formalin latex, and heat-treated at 245° C. for 3 minutes while applying a tension of 1.5 kg per cord. The tenacity of the treated cord is shown in Table 10.

The treated cord was interposed between rubber sheets embedded in a vulcanizing mold, and vulcanized at a temperature of 140° C. and a pressure of 90 kg/cm$^2$ for 40 minutes. Then, the cord was pulled from the resulting rubber sheet at a speed of 200 mm/min, and the load (kg/cm) detected at this time was defined as the adhesion strength of the rubber sheet specimen. The results are shown in Table 10.

To evaluate the deterioration of tenacity under heat, the vulcanization was separately performed at 170° C. and 90 kg/cm$^2$ for 75 minutes, and the tenacity of the product was measured. The results are shown in Table 10 as heat-resistant tenacity.

The above procedure was repeated except that the amount of 2,2'-bis(2-oxazoline) was varied as shown in Table 10. The results are also shown in Table 10 (Examples 43 and 44).

TABLE 10

| | Amount of bis(2-oxazoline) (parts) | Drawn filaments | | Treated cord | | |
|---|---|---|---|---|---|---|
| Example | | Intrinsic viscosity | Terminal COOH content (eq/$10^6$ g) | Adhesion strength (kg/cm) | Tenacity (kg) | Heat-resistance tenacity (kg) |
| 42 | 0.5 | 0.90 | 8 | 17.0 | 21.8 | 7.2 |
| 43 | 0.3 | 0.85 | 16 | 16.5 | 21.3 | 6.4 |
| 44 | 0.7 | 0.92 | 4 | 18.3 | 22.1 | 8.0 |

EXAMPLES 45 TO 47

Example 42 was repeated except that 2,2'-bis(5,6-dihydro-4H-1,3-oxazine) was used in each of the amounts shown in Table 11 instead of the 2,2'-bis(2-oxazoline). The results are shown in Table 11.

TABLE 11

| | Amount of bis-(5,6-dihydro-4H-1,3-oxazine) (parts) | Drawn filaments | | Treated cord | | |
|---|---|---|---|---|---|---|
| Example | | Intrinsic viscosity | Terminal COOH content (eq/$10^6$ g) | Adhesion strength (kg/cm) | Tenacity (kg) | Heat-resistant tenacity (kg) |
| 45 | 0.4 | 0.87 | 17 | 16.8 | 21.5 | 6.1 |
| 46 | 0.6 | 0.90 | 9 | 17.4 | 22.0 | 7.4 |
| 47 | 0.8 | 0.91 | 4 | 18.1 | 22.3 | 8.3 |

EXAMPLES 48 TO 51

One hundred parts of chips of polyethylene terephthalate having an intrinsic viscosity of 0.67 and a terminal carboxyl group content of 44 eq/$10^6$ g were dry-blended with each of the bis-cyclic imino ethers shown in Table 12 in the amounts indicated. The mixture was extruded by an extruder at each of the temperatures with each of the average residence times indicated in Table 12. The cyclic imino ether group content of the resulting pellets (molding material) is shown in Table 12.

The molding material was dried, and injection molded at an injecting temperature of 295° C. with a molding cycle time of about 1 minute. The properties of the resulting article are also shown in Table 12.

TABLE 12

| | bis-cyclic imino ether compound | | Extruding conditions | | Cyclic imino ether group content (eq/$10^6$ g) | Properties of the molded article | |
|---|---|---|---|---|---|---|---|
| Example | Type | Amount (parts) | Temp. (°C.) | Time (sec.) | | Intrinsic viscosity | Terminal COOH content (eq/$10^6$ g) |
| 48 | 2,2-bis(2-oxazoline) | 0.8 | 265 | 80 | 53 | 0.93 | 4 |
| 49 | 2,2'-bis(2-oxazoline) | 0.6 | 260 | 70 | 49 | 0.91 | 6 |
| 50 | 2,2'-bis(5,6-dihydro-4H-1,3-oxazine) | 0.8 | 265 | 80 | 56 | 0.87 | 11 |
| 51 | 2,2'-bis(5,6- | 0.6 | 260 | 70 | 41 | 0.84 | 13 |

TABLE 12-continued

| Example | bis-cyclic imino ether compound | | Extruding conditions | | Cyclic imino ether group content (eq/10⁶ g) | Properties of the molded article | |
|---|---|---|---|---|---|---|---|
| | Type | Amount (parts) | Temp. (°C.) | Time (sec.) | | Intrinsic viscosity | Terminal COOH content (eq/10⁶ g) |
| | dihydro-4H-1,3-oxazine) | | | | | | |

EXAMPLES 52 TO 55

One hundred parts of chips of polytetramethylene terephthalate having an intrinsic viscosity of 0.77 and a terminal carboxyl group content of 52 eq/$10^6$ g were dry-blended with each of the bis-cyclic imino ether compounds shown in Table 13 in the amounts indicated. The resulting mixture was melt-extruded by an extruder at each of the temperatures with each of the average residence times shown in Table 13 to afford pellets. The amounts of cyclic imino ether groups in the resulting pellets (molding material) are shown in Table 13. The molding material was dried, and injection-molded at an injecting temperature of 270° C. with a mold cycle time of about 1 minute. The properties of the resulting molded articles are shown in Table 13.

TABLE 13

| Example | Bis-cyclic imino ether | | Extruding conditions | | Content of cyclic imino ether groups (eq/10⁶ g) | Properties of the molded article | |
|---|---|---|---|---|---|---|---|
| | Type | Amount (parts) | Temp. (°C.) | Time (sec.) | | Intrinsic viscosity | Terminal COOH content (eq/10⁶ g) |
| 52 | 2,2'-bis(2-oxazoline) | 1.0 | 235 | 70 | 90 | 1.12 | 11 |
| 53 | " | 0.6 | 230 | 80 | 55 | 1.09 | 13 |
| 54 | 2,2'-bis(5,6-dihydro-4H-1,3-oxazine) | 1.0 | 240 | 60 | 77 | 1.02 | 14 |
| 55 | 2,2'-bis(5,6-dihydro-4H-1,3-oxazine) | 0.6 | 235 | 80 | 44 | 1.07 | 16 |

EXAMPLES 56 TO 60 AND COMPARATIVE EXAMPLE 18

One hundred parts of chips of each of the thermoplastic resins shown in Table 14 were dry-blended with 2,2'-bis(2-oxazoline) in the amounts indicated in Table 14. The resulting mixture was melt-extruded by an extruder at each of the temperature (resin temperature) shown in Table 14 with an average residence time of about 1 minute to form master chips.

The resulting master chips in the amounts indicated in Table 15 were mixed with 100 parts of polyethylene terephthalate having an intrinsic viscosity of 0.68 and a terminal carboxyl group content of 51 eq/$10^6$ g. The mixture was dried, and then extruded through a T-die at a temperature of about 260° C. with an average residence time of about 2.5 minutes to form a sheet having a thickness of 500 microns. The intrinsic viscosity and terminal carboxyl group content of the resulting sheet are shown in Table 15.

For comparison, the above procedure was repeated except that the master chips were not added. The properties of the resulting sheet are also shown in Table 15.

It is seen from the results that while the molded sheet obtained in Comparative Example 18 decreased in intrinsic viscosity and increased in terminal carboxyl group content, the sheets obtained by using the master chips in accordance with this invention increased in intrinsic viscosity and decreased in terminal carboxyl group content.

TABLE 14

| | Thermoplastic resin used in preparing the master chips | Amount of 2,2'-bis-(2-oxa-zoline) (parts) | Resin temperature in extrusion (°C.) |
|---|---|---|---|
| Example 56 | Polyethylene terephthalate (intrinsic viscosity 0.62; terminal COOH content 22 eq/10⁶ g) | 7 | 255 |
| Example 57 | Polyethylene terephthalate (intrinsic viscosity 0.62; terminal COOH content 22 eq/10⁶ g) | 10 | " |
| Example 58 | Polytetramethylene terephthalate (intrinsic viscosity 0.73; terminal COOH content 25 eq/10⁶ g) | 20 | 230 |
| Example 59 | Polytetramethylene terephthalate (intrinsic viscosity 0.73; terminal COOH content 25 eq/10⁶ g) | 25 | " |
| Example 60 | 2,2'-bis(4-hydroxyphenyl)-propane polycarbonate (Panlite L-1250, a trademark for a product of Teijin Chemical Co., Ltd.) | 10 | 260 |
| Comparative Example 18 | None | — | — |

TABLE 15

| | Amount of the master chips (parts) | Properties of the extrusion-molded article | |
|---|---|---|---|
| | | Intrinsic viscosity | Terminal COOH content (eq/10⁶ g) |
| Example 56 | 7 | 0.96 | 8 |
| Example 57 | 5 | 0.94 | 7 |
| Example 58 | 3 | 0.96 | 6 |
| Example 59 | 2 | 0.97 | 10 |
| Example 60 | 5 | 0.93 | 7 |
| Comparative Example 18 | 0 | 0.61 | 62 |

EXAMPLES 61 AND 62 AND COMPARATIVE EXAMPLE 19

One hundred parts of chips of each of the thermoplastic resins shown in Table 16 were dry-blended with 2,2'-bis(5,6-dihydro-4H-1,3-oxazine) in the amounts indicated in Table 16. The resulting mixture was melt-extruded by an extruder at each of the resin temperatures shown in Table 16 with an average residence time of about 1 minute to form master chips.

The resulting master chips were dry-blended with 100 parts of chips of polytetramethylene terephthalate having an intrinsic viscosity of 0.73 and a terminal carboxyl group content of 53 eq/$10^6$ g. The mixture was dried, and molded into a sheet in the same way as in Examples 56 to 60 except that the extruding temperature was changed to 250° C. The intrinsic viscosities and terminal carboxyl group contents of the resulting sheets are shown in Table 17.

For comparison, the above procedure was repeated except that the master chips were not added. The results are also shown in Table 17.

It is seen from Table 17 that the sheets obtained by using the master chips increased greatly in intrinsic viscosity and decreased in terminal carboxyl group content.

TABLE 16

| | Thermoplastic resin used to prepare the master chips | Amount of 2,2'-bis-(5,6-dihydro-4H-1,3-oxazine) (parts) | Resin temperature (°C.) |
|---|---|---|---|
| Example 61 | Polyethylene terephthalate having 15 mole % of isophthalic acid copolymerized therewith (intrinsic viscosity 0.65; terminal COOH content 28 eq/$10^6$ g) | 12 | 255 |
| Example 62 | Polytetramethylene terephthalate (intrinsic viscosity 0.73; terminal COOH content 25 eq/$10^6$ g) | 24 | 230 |
| Comparative Example 19 | None | 0 | — |

TABLE 17

| | Amount of the master chips (parts) | Properties of the extrusion-molded article | |
|---|---|---|---|
| | | Intrinsic viscosity | Terminal COOH content (eq/$10^6$ g) |
| Example 61 | 5 | 1.08 | 10 |
| Example 62 | 3 | 1.03 | 12 |
| Comparative Example 19 | — | 0.66 | 64 |

COMPARATIVE EXAMPLE 20

A horizontal ester interchange reaction vessel including a rectifying column, a condenser, a stirrer and a heating unit and equipped with a reservoir chamber attached to its exit end was continuously charged with dimethyl terephthalate (heat-melted at 140° C.) and ethylene glycol (heated at 140° C.) at a rate of 500 parts/hour and 275 parts/hour, respectively. Simultaneously, manganese acetate as an ester-interchange catalyst was continuously fed at a rate of 0.17 part per hour, and ester-interchange reaction was performed at an elevated temperature with stirring while distilling off methanol generated. The temperature of the reaction mixture which arrived at the reservoir chamber at the exit end of the reaction vessel after a residence time of 150 minutes was 240° C. The reservoir chamber was charged with trimethyl phosphate as a stabilizer; antimony trioxide as a polycondensation catalyst and titanium dioxide as a delusterant at a rate of 0.13 part, 0.23 part and 1.5 parts per hour, respectively. The reaction product discharged from the exit of the ester-interchange reaction vessel was fed to a polymerization reaction vessel continuously without stoppage at the reservoir chamber, and polycondensed under reduced pressure. The polymerization reaction vessel consisted of three unit vessels each of which was of horizontal type and equipped with a glycol distilling tower, a vacuum suction device, a stirrer and a heating unit. In a first unit vessel, the reaction was carried out at a temperature of 240° C. and a pressure of 50 mmHg with a residence time of 90 minutes. In a second unit vessel, the reaction was carried out at a temperature of 278° C. and a pressure of 3 mmHg with a residence time of 70 minutes. In a third unit vessel, the reaction was carried out at a temperature of 281° C. and a pressure of 1 mmHg with a residence time of 70 minutes. At the exit of the third unit vessel, the resulting polyester had an intrinsic viscosity of 0.62 and a terminal carboxyl group content of 24 eq/$10^6$ g.

The polyester was directly conducted to a gear pump, and extruded from a spinning pack having a spinneret with 36 spinning orifices having a circular cross section and a diameter of 0.3 mm at a rate of 32 g/min./spindle to form undrawn filaments. The temperature of the polyester during extrusion was 285° C., and the filament take-up speed was 1200 meters/min. The resulting undrawn filaments had an intrinsic viscosity of 0.61 and a terminal carboxyl group content of 25 eq/$10^6$ g. The undrawn filaments were drawn to 3.2 times using hot rollers at 84° C. to form drawn filaments (75 de/36 fil). The intrinsic viscosity and terminal carboxyl group content of the drawn filaments were substantially the same as those of the undrawn filaments.

EXAMPLE 63

Chips of polyethylene terephthalate having an intrinsic viscosity of 0.80 and a terminal carboxyl group content of 20 eq/$10^6$ were fed into a twin-screw extruder using a screw-type chip feeder, and powdery bis(2-oxazoline) was fed into the extruder by using a powder feeder. The two materials were pre-mixed in the twin-screw extruder at a temperature of 275° C. with a residence time of about 1 minute. Then, the mixture was extruded into a water bath to quench it, and then cut. The resulting master chips were dried at 120° C. for 2 hours. The effective bis(2-oxazoline) concentration of the master chips was 8.4% by weight.

The master chips were melted at 280° C. by an extruder and continuously fed into the inlet of the same gear pump as used in Comparative Example 20 at a rate of 20 parts per hour. In the meantime, the same polyester as prepared in Comparative Examples was directly fed into the same gear pump and mixed with the master chips. The molten mixture was spun in the same way as in Comparative Example 20.

The resulting undrawn filaments extruded from the spinning pack had an intrinsic viscosity of 0.71, and a terminal carboxyl group content of 3 eq/$10^6$ g. The undrawn filaments were drawn to 3.2 times using hot rollers at 84° C. to form drawn filaments (75 denier/36 fil).

EXAMPLES 64 TO 68 AND COMPARATIVE EXAMPLES 21 AND 22

One hundred parts of dry pellets of polyethylene terephthalate having an intrinsic viscosity of 0.73 and a terminal carboxyl group content of 34 eq/$10^6$ g were dry-blended with a predetermined amount of each of the epoxy compounds indicated in Table 18 and 0.5 part of 2,2'-bis(2-oxazoline). The resulting mixture was melt-extruded from an extruder equipped with a spinneret having orifices with a diameter of 0.5 mm at about 290° C. with an average residence time of about 3 minutes to form undrawn filaments. The undrawn filaments were drawn to 5.5 times at 80° C., and heat-treated at 210° C. The intrinsic viscosity and terminal carboxyl group content of the resulting filaments are shown in Table 18.

For comparison, the above procedure was repeated except that the epoxy compound was added but 2,2'-bis(2-oxazoline) was not added (Comparative Example 21); or that both of these compounds were not added (Comparative Example 22). The results are also shown in Table 18.

TABLE 18

| | Epoxy compound | | Properties of the drawn filaments | |
|---|---|---|---|---|
| | Type | Amount (parts) | Intrinsic viscosity | Terminal COOH content (eq/$10^6$g) |
| Example 64 | N-glycidyl phthalimide | 0.3 | 0.90 | 3 |
| Example 65 | phenyl glycidyl ether | 0.5 | 0.92 | 3 |
| Example 66 | bisphenol A diglycidyl ether | 0.3 | 0.88 | 4 |
| Example 67 | $CH_3(CH_2)_{13}\text{-}CH\text{---}CH_2$ with O bridge | 0.5 | 0.93 | 4 |
| Example 68 | triglycidyl isocyanurate | 0.3 | 0.93 | 3 |
| Comparative Example 21 | N-glycidyl phthalimide | 1.0 | 0.67 | 14 |
| Comparative Example 22 | None | 0 | 0.68 | 39 |

EXAMPLES 69 TO 72 AND COMPARATIVE EXAMPLES 23 AND 24

One hundred parts of dry pellets of polytetramethylene terephthalate having an intrinsic viscosity of 0.83 and a terminal carboxyl group content of 48 eq/$10^6$ g were mixed with 0.5 part of N-glycidyl phthalimide as a mono-epoxy compound and each of the bis-cyclic imino ether compounds shown in Table 19 in the amounts indicated. The resulting mixture was melt-extruded by an extruder equipped with a T-die at about 270° C. with an average residence time of 2.5 minutes to form a sheet having a thickness of 100 microns. The intrinsic viscosity and terminal carboxyl group content of the sheet are shown in Table 19.

For comparison, the above procedure was repeated except that the bis-cyclic imino ether compound was not added (Comparative Example 23); or that both of the epoxy compound and the bis-cyclic imino ether compound were not added (Comparative Example 24). The results are also shown in Table 19.

TABLE 19

| | Bis-cyclic imino ether | | Properties of the sheet | |
|---|---|---|---|---|
| | Type | Amount (parts) | Intrinsic viscosity | Terminal COOH content (eq/$10^6$ g) |
| Example 69 | 2,2'-bis(2-oxazoline) | 0.5 | 0.97 | 8 |
| Example 70 | 2,2'-bis(5,6-dihydro-4H-1,3-oxazine) | 0.6 | 0.95 | 10 |
| Example 71 | N,N'-hexamethylene-bis(2-carbamoyl-2-oxazoline) | 0.8 | 0.95 | 8 |
| Example 72 | 2,2'-hexamethylene-bis(2-carbamoyl-5,6-dihydro-4H-1,3-oxazine) | 0.8 | 0.92 | 12 |
| Comparative Example 23 | None | 0 | 0.79 | 31 |
| Comparative Example 24 | None | 0 | 0.80 | 56 |

EXAMPLES 73 TO 75 AND COMPARATIVE EXAMPLE 25

One hundred parts of dry pellets of polyethylene terephthalate having an intrinsic viscosity of 0.61 and a terminal carboxyl group content of 14 eq/$10^6$ g were mixed with 0.3 part of α-olefin oxide (AOEX 68, a trademark for a product of Daiseru Kagaku Kogyo K.K.) and each of the bis-cyclic imino ether compounds shown in Table 20 in the amounts indictated. The mixture was melt-extruded by the same extruder as used in Examples 64 to 68 at a temperature of about 275° C. with an average residence time of about 3 minutes, and then spun and drawn under the same conditions as in Examples 64 to 68. The results are shown in Table 20. The results are shown in Table 20.

For comparison, the above procedure was repeated except that only the α-olefin oxide was added. The results are also shown in Table 20.

TABLE 20

| | Bis-cyclic imino ether | | Properties of the filaments | |
|---|---|---|---|---|
| | Type | Amount (parts) | Intrinsic viscosity | Terminal COOH content (eq/$10^6$ g) |
| Example 73 | 2,2'-bis(2-oxazoline) | 0.15 | 0.65 | 2 |
| Example 74 | 2,2'-bis(5,6-dihydro-4H-1,3-oxazine) | 0.20 | 0.63 | 3 |
| Example 75 | N,N'-tetramethylene-bis(2-carbamoyl-2-oxazoline) | 0.3 | 0.63 | 3 |
| Comparative Example 25 | None | 0 | 0.58 | 16 |

EXAMPLES 76 TO 80 AND COMPARATIVE EXAMPLES 26 AND 27

One hundred parts of dry pellets of polyethylene terephthalate having an intrinsic viscosity of 0.75 and a terminal carboxyl group content of 16 eq/$10^6$ g were dry-blended with 0.2 part of 2,2'-bis(2-oxazoline). The mixture was melted by an extruder at a temperature of about 290° C. with an average residence time of 2 minutes. Each of the epoxy compounds shown in Table 21, separately heated and melted, was metered by a gear pump and added in the amounts indicated in Table 21, and the mixture was allowed to reside in the extruder for about 1 minute. Then, the mixture was spun from spinning orifices having a diameter of 0.5 mm, drawn to 5.5 times at 80° C., and heat-treated at 210° C. The intrinsic viscosity and terminal carboxyl group content of the resulting filaments are shown in Table 21.

For comparison, the above procedure was repeated except that both of the 2,2'-bis(2-oxazoline) and the monoepoxy compound were not used (Comparative Example 26); or that only the monoepoxy compound was used (Comparative Example 27). The results are also shown in Table 21.

EXAMPLES 81 TO 86

One hundred parts of polytetramethylene terephthalate having an intrinsic viscosity of 0.73 and a terminal carboxyl group content of 38 eq/$10^6$ g were mixed with each of the bis-cyclic imino ether compounds and each of the bis-cyclic imino ester compounds shown in Table 22 in the amounts indicated, and reacted with stirring for 5 minutes in a stream of nitrogen gas at about 245° C.

The intrinsic viscosities and terminal carboxyl group contents of the resulting polymers are shown in Table 22.

TABLE 22

| | Bis-cyclic imino ether compound | | Bis-cyclic imino ester compound | | Properties of the polymer | |
|---|---|---|---|---|---|---|
| Example | Type | Amount (parts) | Type | Amount (parts) | Intrinsic viscosity | Terminal COOH content (eq/$10^6$ g) |
| 81 | N,N'-hexamethylenebis(2-carbamoyl-2-oxazoline) | 0.9 | 2,2'-p-phenylenebis[4,4-dimethyl-5(4H)oxazolone] | 1.0 | 1.24 | 10 |
| 82 | N,N'-hexamethylenebis(2-carbamoyl-2-oxazoline) | 0.8 | 2,2'-phenylenebis[5(4H)-oxazolone] | 0.7 | 1.12 | 12 |
| 83 | N,N'-hexamethylenebis(2-carbamoyl-2-oxazoline) | 0.8 | 2,2'-phenylenebis(3,1-benzoxazin-4-one) | 0.8 | 1.26 | 11 |
| 84 | 2,2'-bis(2-oxazoline) | 0.6 | 2,2'-tetramethylenebis-(3,1-benzoxazin-4-one) | 0.8 | 1.04 | 13 |
| 85 | 2,2'-bis(2-oxazoline) | 0.6 | 2,2'-bis(3,1-benzoxazin-4-one) | 1.0 | 1.28 | 8 |
| 86 | 2,2'-bis(2-oxazoline) | 0.6 | 2,8-dimethyl-4H,6H-benzo[1,2-d:5,4-d']-bis-[1,3]oxazine-4,6-dione | 0.8 | 1.20 | 9 |

EXAMPLES 87 TO 93

One hundred parts of polyethylene terephthalate having an intrinsic viscosity of 0.63 and a terminal carboxyl group content of 29 eq/$10^6$ g were mixed with each of the bis-cyclic imino ether compounds and each of the bis-cyclic imino ester compounds shown in Table 23. The mixture was melt-extruded by an extruder at about 280° C. with an average residence time of about 7 minutes. The properties of the resulting polymers are shown in Table 23.

TABLE 21

| | Bis-cyclic imino ether compound | | Epoxy compound | | Properties of the filaments | |
|---|---|---|---|---|---|---|
| | Type | Amount (parts) | Type | Amount (parts) | Intrinsic viscosity | Terminal COOH content (eq/$10^6$ g) |
| Example 76 | 2,2'-bis(2-oxazoline) | 0.2 | α-olefin epoxy (*1) | 0.5 | 0.89 | 4 |
| Example 77 | " | 0.2 | " | 1.0 | 0.87 | 3 |
| Example 78 | " | 0.2 | N-glycidyl phthalimide | 0.5 | 0.88 | 3 |
| Example 79 | " | 0.2 | N-glycidyl phthalimide | 1.0 | 0.84 | 3 |
| Example 80 | " | 0.2 | α-olefin epoxy (*2) | 0.5 | 0.88 | 4 |
| Comparative Example 26 | None | 0 | None | 0 | 0.68 | 21 |
| Comparative Example 27 | None | 0 | N-glycidyl phthalimide | 0.5 | 0.65 | 12 |

(*1): Having the chemical formula R—CH—CH$_2$ (epoxide ring) in which R is a linear alkyl group having 16 to 18 carbon atoms.

(*2): Having the chemical formula R—CH—CH$_2$ (epoxide ring) in which R is a linear alkyl group having 20 to 28 carbon atoms.

TABLE 23

| Example | Bis-cyclic imino ether compound Type | Amount (parts) | Bis-cyclic imino ester compound Type | Amount (parts) | Properties of the polymer Intrinsic viscosity | Terminal COOH content (eq/$10^6$ g) |
|---|---|---|---|---|---|---|
| 87 | 2,2'-bis(2-oxazoline) | 0.5 | 2,2'-bis(3,1-benzoxazin-4-one) | 1.0 | 1.15 | 15 |
| 88 | 2,2'-bis(5,6-dihydro-4H-1,3-oxazine) | 0.6 | 2,2'-bis(3,1-benzoxazin-4-one) | 0.8 | 1.12 | 13 |
| 89 | 2,2'-bis(2-oxazoline) | 0.6 | 2,2'-p-phenylenebis(3,1-benzoxazin-4-one) | 1.3 | 1.04 | 12 |
| 90 | 2,2'-bis(5,6-dihydro-4H-1,3-oxazine) | 0.6 | 2,2'-p-phenylenebis(3,1-benzoxazin-4-one) | 1.2 | 1.02 | 11 |
| 91 | N,N'-hexamethylenebis(2-carbamoyl-2-oxazoline) | 0.7 | 2,2'-bis(3,1-benzoxazin-4-one) | 1.0 | 1.08 | 15 |
| 92 | N,N'-p-phenylenebis(2-carbamoyl-2-oxazoline) | 0.6 | 2,2'-bis(3,1-benzoxazin-4-one) | 1.0 | 1.05 | 12 |
| 93 | N,N'-ethylenebis(2-oxazoline) | 0.6 | 2,2'-bis(3,1-benzoxazin-4-one) | 1.0 | 1.10 | 11 |

EXAMPLE 94

One hundred parts of dry chips of the polyethylene terephthalate having an intrinsic viscosity of 0.71 and a terminal carboxyl group content of 34 eq/$10^6$ g were dry-blended with 0.5 part of the bis(2-oxazoline). The mixture was fed into a film-forming machine, and melt-extruded through a T-die at a temperature of 300° C. with an average residence time of about 2 minutes. The resulting film was stretched to 3.5 times at 85° C. in the machine direction, and then to 3.7 times at 95° C. in the transverse direction, and then heat-set at 230° C. for 15 seconds to form a biaxially stretched film having a thickness of 75 microns and the intrinsic viscosity and terminal carboxyl group content shown in Table 24. The amount of oligomer extruded and the heat-degradation life of the film were also determined and the results are shown in Table 24.

The last two properties were determined as follows:

(1) Heat degradation life

A film sample was heat-deteriorated in the relaxed state in a Geer's aging tester maintained at 180° C.±1° C., and the periodical changes of its elongation at break were measured. The time which elapsed until its elongation decreased to half was measured, and defined as the deterioration life which is a measure of heat deterioration resistance.

(2) Amount of oligomer extruded

About 10 g of a film sample was extruded with about 300 ml of boiling xylene for 48 hours. The film was dried at 150° C. under reduced pressure for 30 hours, and the weight decrease in percentage based on the original film was measured, and made a measure of the amount of the oligomer extracted.

TABLE 24

| | Properties of the biaxially stretched film | | | |
|---|---|---|---|---|
| | Intrinsic viscosity | Terminal COOH content (eq/$10^6$ g) | Heat-deterioration life (hours) | Amount of oligomer extracted (wt. %) |
| Example 94 | 0.91 | 15 | 361 | 0.6 |

It is seen from the above table that the biaxially stretched film obtained have superior properties for use as electrical insulating material.

EXAMPLES 95 AND 96 AND COMPARATIVE EXAMPLES 27 AND 28

Seventy parts of dry pellets of polyethylene terephthalate having an intrinsic viscosity of 0.71 and a terminal carboxyl group content of 29 eq/$10^6$ g and glass fibers (chopped strand, 10 microns in diameter and 5 mm in length) in an amount of 30 parts per 100 parts by weight of the polymer pellets and the glass fibers combined were fed at a constant rate, and compounded by an extruder at 270° C. The pellets of the compound obtained were injection-molded at a cylinder temperature of 270° C. and a mold temperature of 140° C. under an injecting pressure of 800 kg/cm² (Comparative Example 27).

Seventy parts of dry pellets of polyethylene terephthalate having an intrinsic viscosity of 0.60 and a terminal carboxyl content of 20 eq/$10^6$ g, the same proportion as above of glass fibers, and 0.3 part, per 100 parts by weight of the pellets and the glass fibers combined, of 2,2'-bis(2-oxazoline) were fed at a constant rate and compounded by an extruder. The resulting pellets of the compound were injection-molded (Example 95).

Seventy parts of dry pellets of polyethylene terephthalate having an intrinsic viscosity of 0.60 and a terminal carboxyl group content of 20 eq/$10^6$ g and 30 parts of glass fibers were compounded by an extruder. The compound was dry-blended with 0.3 part, per 100 parts of the compound, of 2,2'-bis(2-oxazoline). The resulting mixture was injection-molded (Example 96).

The compounding conditions and injection-molding conditions in Examples 95 and 96 were the same as in Comparative Example 27. The residence time of the polymer in the extruder was adjusted to 2.5 minutes at the time of compounding and to 40 seconds at the time of molding.

Separately, Comparative Example 27 was repeated except that polyethylene terephthalate having an intrinsic viscosity of 0.60 and a terminal carboxyl group content of 20 eq/$10^6$ g was used instead of the polyethylene terephthalate used in Comparative Example 27 (Comparative Example 28).

The properties of the compounds and the molded articles are shown in Table 25.

TABLE 25

| | Intrinsic viscosity of the starting chips | Compound obtained | | Molded article | | Properties of the molded article | | | |
|---|---|---|---|---|---|---|---|---|---|
| | | Content (parts) of oxazoline | Intrinsic viscosity | Content (parts) of oxazoline | Intrinsic viscosity | Tensile strength (kg/cm$^2$) | Flexural strength (kg/cm$^2$) | Impact strength (notched; kg . cm/cm) | |
| | | | | | | | | ¼ inch | ⅛ inch |
| Comparative Example 27 | 0.71 | 0 | 0.65 | 0 | 0.60 | 1500 | 2200 | 10.0 | 8.4 |
| Example 95 | 0.60 | 0.3 | 0.65 | 0 | 0.60 | 1620 | 2400 | 11.0 | 9.1 |
| Example 96 | 0.60 | 0 | 0.56 | 0.3 | 0.60 | 1600 | 2400 | 11.0 | 9.3 |
| Comparative Example 28 | 0.60 | 0 | 0.56 | 0 | 0.51 | 1300 | 2030 | 8.8 | 7.5 |

It is seen from the above table that the molded article obtained without the addition of the bis(2-oxazoline) showed inferior properties to the molded article obtained by adding the bis(2-oxazoline) even when the intrinsic viscosity of the former was the same as that of the latter.

The products obtained were each observed by soft X-rays, and it was found that in the product of Comparative Example 27, the dispersion of the glass fibers was apparently poor, and this presumably caused the inferior properties.

EXAMPLE 97

Example 95 was repeated except that at the time of producing the compound, 0.2 part of 2,2'-bis(2-oxazoline) and 0.2 part of 2,2'-p-phenylenebis[4,4'-dimethyl-5(4H)-oxazolone] were added. The molded article had an intrinsic viscosity of 0.62, a tensile strength of 1640 kg/cm$^2$, a flexural strength of 2450 kg/cm$^2$, an impact strength (notched) of 11.0 kg·cm/cm at ¼" and 9.5 kg·cm/cm at ⅛".

What we claim is:

1. A process for producing an aromatic polyester having an increased degree of polymerization, which comprises reacting a substantially linear, fiber forming aromatic polyester containing terminal carboxyl groups and having an aromatic dicarboxylic acid as a main acid component at an elevated temperature with a bis-cyclic imino ether compound of the formula

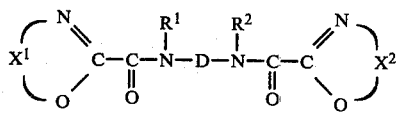

wherein X$^1$ and X$^2$ are identical or different and each represents a divalent hydrocarbon group which is non-reactive under the reaction conditions and has 2 or 3 carbon atoms as members of the imino ether ring, R$^1$ and R$^2$ are identical or different and each represents a hydrogen atom or a monovalent hydrocarbon group, or R$^1$ and R$^2$ may be linked to each other to form a 5- or 6-membered ring together with D and the two nitrogen atoms to which they are bonded, D represents a divalent hydrocarbon group non-reactive under the reaction conditions which may contain a hetero atom, and n is 0 or 1, thereby bonding the molecular chains of the aromatic polyester to each other by the terminal carboxyl groups thereof to rapidly form said aromatic polyester having an increased degree of polymerization.

2. The process of claim 1 wherein said bis-cyclic imino ether compound is expressed by the following formula

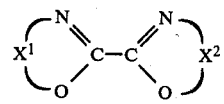

3. The process of claim 2 wherein X$^1$ and X$^2$ represent an ethylene or trimethylene group.

4. The process of claim 1 wherein said bis-cyclic imino ether compound is expressed by the following formula

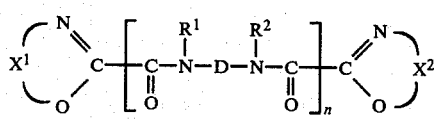

5. The process of claim 4 wherein X$^1$ and X$^2$ represent an ethylene or trimethylene group.

6. The process of claim 5 wherein R$^1$ and R$^2$ represent a hydrogen atom or an alkyl group having 1 to 6 carbon atoms.

7. The process of claim 6 wherein D represents an alkylene group having 2 to 12 carbon atoms, a cycloalkylene group having 5 to 12 carbon atoms, an arylene group having 7 to 24 carbon atoms, or an alkylene-arylene-alkylene group having 8 to 24 carbon atoms.

8. The process of claim 1 wherein the amount of said bis-cyclic imino ether compound is 0.05 to 10 moles per equivalent of the terminal carboxyl groups of the aromatic polyester.

9. The process of claim 8 wherein the amount of said bis-cyclic imino ether compound is 0.05 to 5 moles per equivalent of the terminal carboxyl groups of the aromatic polyester.

10. The process of claim 9 wherein the amount of said bis-cyclic imino ether compound is 0.1 to 2 moles per equivalent of the terminal carboxyl groups of the aromatic polyester.

11. The process of claim 1 wherein said starting aromatic polyester contains terminal carboxyl groups in a concentration of at least 10 equivalents per 10$^6$ g of the aromatic polyester.

12. The process of claim 11 wherein said starting aromatic polyester contains terminal carboxyl groups in a concentration of at least 15 equivalents per 10$^6$ g of the aromatic polyester.

13. The process of claim 1 wherein said reaction is carried out under atmospheric or elevated pressure.

14. The process of claim 1 wherein said reaction is carried out at a temperature above the melting temperature of said aromatic polyester.

15. The process of claim 1 wherein said reaction is carried out at a temperature below the melting temperature of the aromatic polyester.

16. A process for producing an aromatic polyester having an increased degree of polymerization, which comprises reacting a substantially linear, fiber forming aromatic polyester containing terminal hydroxyl groups and having an aromatic dicarboxylic acid as a main acid component at an elevated temperature with (1) an organic dicarboxylic acid anhydride capable of forming terminal carboxyl groups by reaction with the terminal hydroxyl groups of said polyester and (2) a bis-cyclic imino ether compound of the formula

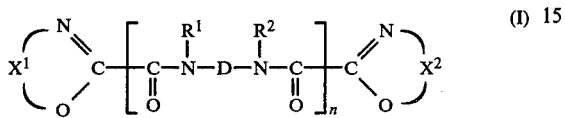  (I)

wherein $X^1$ and $X^2$ are identical or different and each represents a divalent hydrocarbon group which is non-reactive under the reaction conditions and has 2 or 3 carbon atoms as members of the imino ether ring, $R^1$ and $R^2$ are identical or different and each represents a hydrogen atom or a monovalent hydrocarbon group, or $R^1$ and $R^2$ may be linked to each other to form a 5- or 6-membered ring together with D and the two nitrogen atoms to which they are bonded, D represents a divalent hydrocarbon group non-reactive under the reaction conditions which may contain a hetero atom, and n is 0 or 1, thereby converting the terminal hydroxyl groups of the aromatic polyester to terminal carboxyl groups and bonding the molecular chains of the aromatic polyester to each other by its terminal carboxyl groups including said terminal carboxyl groups converted from the hydroxyl groups to rapidly form said aromatic polyester having an increased degree of polymerization.

17. The process of claim 16 wherein the reaction between the organic dicarboxylic acid anhydride and the terminal hydroxyl groups of the aromatic polyester is carried out before, or concurrently with, the reaction between the bis-cyclic imino ether and the terminal carboxyl groups of the aromatic polyester.

18. The process of claim 17 wherein said organic dicarboxylic acid anhydride is an intramolecular or intermolecular anhydride of an organic dicarboxylic acid.

19. The process of claim 18 wherein said organic dicarboxylic acid anhydride is an aliphatic dicarboxylic acid anhydride, an alicyclic dicarboxylic acid anhydride, or an aromatic dicarboxylic acid anhydride.

20. A process for producing an aromatic polyester having an increased degree of polymerization, which comprises reacting a substantially linear fiber-forming aromatic polyester having an aromatic dicarboxylic acid as a main acid component and containing terminal hydroxyl groups and terminal carboxyl groups at an elevated temperature with a bis-cyclic imino ether compound of the formula

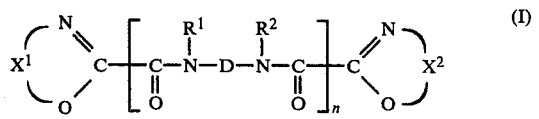  (I)

wherein $X^1$ and $X^2$ are identical or different and each represents a divalent hydrocarbon group which is non-reactive under the reaction conditions and has 2 or 3 carbon atoms as members of the imino ether ring, $R^1$ and $R^2$ are identical or different and each represents a hydrogen atom or a monovalent hydrocarbon group, or $R^1$ and $R^2$ may be linked to each other to form a 5- or 6-membered ring together with D and the two nitrogen atoms to which they are bonded, D represents a divalent hydrocarbon group non-reactive under the reaction conditions which may contain a hetero atom, and n is 0 or 1, and a bis-cyclic imino ester compound of the formula

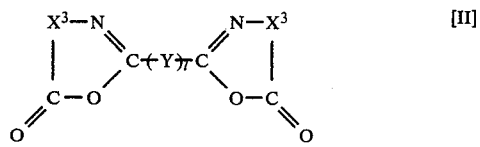  [II]

wherein Y represents a divalent hydrocarbon group which may further contain a hetero atom, $X^3$ represents a divalent hydrocarbon group which contains 1 or 2 carbon atoms as members of the above imino ester ring and is non-reactive under the reaction conditions, and l is 0 or 1, or of the following formula

  [III]

wherein A represents a grouping of the formula

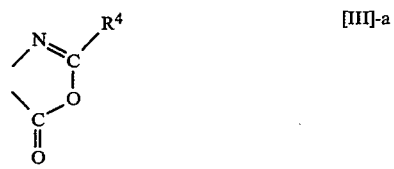  [III]-a in which $R^4$ represents a monovalent hydrocarbon group, or a grouping of the formula

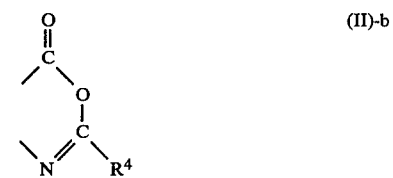  (II)-b in which $R^4$ is as defined above; R represents a tetravalent aromatic group which may further contain a hetero atom; and $R^3$ represents a monovalent aromatic hydrocarbon which is identical to or different from $R^4$; thereby bonding the molecular chains of the aromatic polyester to each other by the reaction of the terminal carboxyl groups with the bis-cyclic imino ether of formula [I] and bonding the molecular chains of the aromatic polyester to each other by the reaction of the terminal hydroxyl groups with the bis-cyclic imino ester of formula [II] of [III] to rapidly form said aromatic polyester having an increased degree of polymerization.

21. The process of claim 20 wherein the amount of said bis-cyclic imino ether is 0.05 to 10 moles per equivalent of the terminal carboxyl groups of the aromatic polyester, and the amount of said bis-cyclic imino ester is 0.05 to 2 moles per equivalent of the terminal hydroxyl groups of the aromatic polyester.

22. A process for producing a molded article composed of an aromatic polyester having an increased degree of polymerization, which comprises contacting a substantially linear, fiber forming aromatic polyester containing terminal carboxyl groups and having an aromatic dicarboxylic acid as a main acid component intimately with a bis-cyclic imino ether compound of the formula

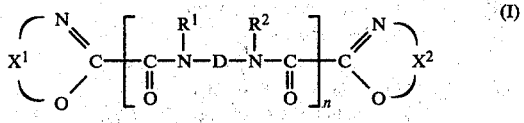

wherein $X^1$ and $X^2$ are identical or different and each represents a divalent hydrocarbon group which is non-reactive under the reaction conditions and has 2 or 3 carbon atoms as members of the imino ether ring, $R^1$ and $R^2$ are identical or different and each represents a hydrogen atom or a monovalent hydrocarbon group, or $R^1$ and $R^2$ may be linked to each other to form a 5- or 6-membered ring together with D and the two nitrogen atoms to which they are bonded, D represents a divalent hydrocarbon group non-reactive under the reaction conditions which may contain a hetero atom, and n is 0 or 1, in a melt-molding machine at a temperature above the melting temperature of said aromatic polyester to thereby bond the molecular chains of said aromatic polyester by the reaction of the terminal carboxyl groups with the bis-cyclic imino ether, and converting the resulting aromatic polyester having an increased degree of polymerization in the molten state into a molded article in situ.

23. The process of claim 22 wherein said bis-cyclic imino ether is used in a form incorporated in the unreacted state in a thermoplastic resin.

24. The process of claim 23 wherein said thermoplastic resin is an aromatic polyester.

25. A process for producing a molded article composed of an aromatic polyester having an increased degree of polymerization, which comprises reacting a substantially linear, fiber forming aromatic polyester containing terminal carboxyl groups and having an aromatic dicarboxylic acid as a main acid component with a bis-cyclic imino ether compound of the formula

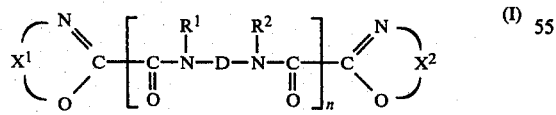

wherein $X^1$ and $X^2$ are identical or different and each represents a divalent hydrocarbon group which is non-reactive under the reaction conditions and has 2 or 3 carbon atoms as members of the imino ether ring, $R^1$ and $R^2$ are identical or different and each represents a hydrogen atom or a monovalent hydrocarbon group, or $R^1$ and $R^2$ may be linked to each other to form a 5- or 6-membered ring together with D and the two nitrogen atoms to which they are bonded, D represents a divalent hydrocarbon group non-reactive under the reaction conditions which may contain a hetero atom, and n is 0 or 1, at a temperature above the melting temperature of the aromatic polyester so that unreacted cyclic imino ether groups remain to thereby obtain an aromatic polyester molding material, and then melting the molding material in a melt-molding machine to convert it into a molded article composed of said aromatic polyester having an increased degree of polymerization.

26. A process for producing a molded article composed of an aromatic polyester having an increased degree of polymerization, which comprises reacting a substantially linear, fiber forming aromatic polyester containing terminal carboxyl groups and having an aromatic dicarboxylic acid as a main acid component with a bis-cyclic imino ether compound of the formula

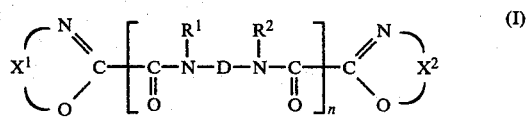

wherein $X^1$ and $X^2$ are identical or different and each represents a divalent hydrocarbon group which is non-reactive under the reaction conditions and has 2 or 3 carbon atoms as members of the imino ether ring, $R^1$ and $R^2$ are identical or different and each represents a hydrogen atom or a monovalent hydrocarbon group, or $R^1$ and $R^2$ may be linked to each other to form a 5- or 6-membered ring together with D and the two nitrogen atoms to which they are bonded, D represents a divalent hydrocarbon group non-reactive under the reaction conditions which may contain a hetero atom, and n is 0 or 1, at a temperature above the melting temperature of the aromatic polyester so that unreacted cyclic imino ether groups remain, molding the resulting aromatic polyester, and then heating the resulting molded article at an elevated temperature at which the molded article can retain its form, to thereby bond the molecular chains of the aromatic polyester to each other by its terminal carboxyl groups.

27. A process for producing a molded article composed of an aromatic polyester at least the surface of which has an increased degree of polymerization, said process comprising heat-treating a molded article of a substantially linear, fiber forming aromatic polyester containing terminal carboxyl groups and having an aromatic dicarboxylic acid as a main acid component with a biscyclic imino ether compound of the formula

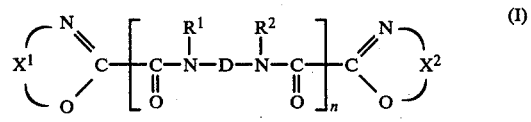

wherein $X^1$ and $X^2$ are identical or different and each represents a divalent hydrocarbon group which is non-reactive under the reaction conditions and has 2 or 3 carbon atoms as members of the imino ether ring, $R^1$ and $R^2$ are identical or different and each represents a hydrogen atom or a monovalent hydrocarbon group, or $R^1$ and $R^2$ may be linked to each other to form a 5- or 6-membered ring together with D and the two nitrogen atoms to which they are bonded, D represents a divalent hydrocarbon group non-reactive under the reaction conditions which may contain a hetero atom, and n is 0 or 1, at an elevated temperature at which the molded article can retain its form, to thereby bond the molecular chains of the aromatic polyester to each other by its terminal carboxyl groups.

28. The process of any one of claims 1, 16 and 20 wherein said main acid component of said aromatic polyester is terephthalic acid.

29. The process of any one of claims 1, 16 and 20 wherein said aromatic polyester comprises ethylene terephthalate or tetramethylene terephthalate as a main recurring unit.

30. The process of and one of claims 22 to 27 wherein the main acid component of said aromatic polyester is terephthalic acid.

31. The process of any one of claims 22 to 27 wherein said aromatic polyester comprises ethylene terephthalate or tetramethylene terephthalate as a main recurring unit.

32. An aromatic polyester obtained by the process of any one of claims 1, 16 and 20 wherein said aromatic polyester comprises ethylene terephthalate or tetramethylene terephthalate as a main recurring unit.

33. A molded article composed of the aromatic polyester of any of claims 1, 16 and 20 wherein said aromatic polyester comprises ethylene terephthalate or tetramethylene terephthalate as a main recurring unit.

34. A molded article of aromatic polyester, obtained by the process of any one of claims 22 to 27, wherein said aromatic polyester comprises ethylene terephthalate or tetramethylene terephthalate as a main unit.

35. The molded article of any one of claims 1, 16, 20 and 22-27 which is in the form of fibers or films, said aromatic polyester comprising ethylene terephthalate or tetramethylene terephthalate as a main recurring unit.

36. The molded article of any one of claims 1, 16, 20 and 22-27 wherein the fibers are reinforcing fibers for rubber structures and wherein said aromatic polyester comprises ethylene terephthalate or tetramethylene terephthalate as a main recurring unit.

37. The molded article of any one of claims 1, 16, 20 and 22-27 wherein the films are magnetic recording films and wherein said aromatic polyester comprises ethylene terephthalate or tetramethylene terephthalate as a main recurring unit.

38. The molded article of any one of claims 1, 16, 20 and 22-27 wherein the films are electrical insulation films and wherein said aromatic polyester comprises ethylene terephthalate or tetramethylene terephthalate as a main recurring unit.

* * * * *

UNITED STATES PATENT AND TRADEMARK OFFICE
CERTIFICATE OF CORRECTION

PATENT NO. : 4,331,800
DATED : May 25, 1982
INVENTOR(S) : Inata, et al.

It is certified that error appears in the above—identified patent and that said Letters Patent is hereby corrected as shown below:

IN THE CLAIMS:

Claim 26, formula (I) should read as follows:

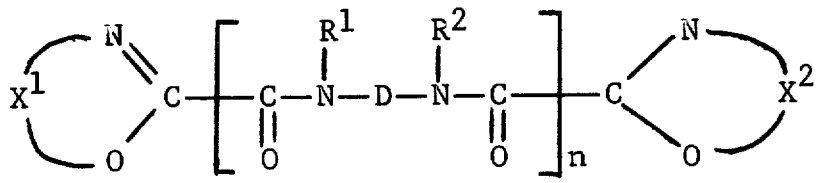

Signed and Sealed this

Seventeenth Day of August 1982

[SEAL]

Attest:

Attesting Officer

GERALD J. MOSSINGHOFF

Commissioner of Patents and Trademarks